US012810483B2

(12) United States Patent
Kim et al.

(10) Patent No.: US 12,810,483 B2
(45) Date of Patent: Nov. 24, 2026

(54) MESH COMPRESSION WITH BASE MESH INFORMATION SIGNALED IN A FIRST SUB-BITSTREAM AND SUB-MESH INFORMATION SIGNALED WITH DISPLACEMENT INFORMATION IN AN ADDITIONAL SUB-BITSTREAM

(71) Applicant: Apple Inc., Cupertino, CA (US)

(72) Inventors: Jungsun Kim, Sunnyvale, CA (US); Alexandros Tourapis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 18/908,679

(22) Filed: Oct. 7, 2024

(65) Prior Publication Data

US 2025/0117965 A1 Apr. 10, 2025

Related U.S. Application Data

(60) Provisional application No. 63/588,967, filed on Oct. 9, 2023.

(51) Int. Cl.

*H04N 19/70* (2014.01)
*G06T 9/00* (2006.01)
*H04N 19/54* (2014.01)

(52) U.S. Cl.

CPC ............. *G06T 9/001* (2013.01); *H04N 19/70* (2014.11)

(58) Field of Classification Search

None

See application file for complete search history.

(56) References Cited

U.S. PATENT DOCUMENTS

2023/0290011 A1 9/2023 Kim et al.
2024/0144541 A1 5/2024 Kim et al.
(Continued)

FOREIGN PATENT DOCUMENTS

JP 2012080210 A 4/2012
JP 2024152168 A 10/2024
(Continued)

OTHER PUBLICATIONS

Extended European Search Report from Application No. 24205289.2-1207, dated Mar. 7, 2025, pp. 1-10.
(Continued)

*Primary Examiner* — Christopher Braniff

(74) *Attorney, Agent, or Firm* — Alexander A. Knapp; Kowert, Hood, Munyon, Rankin & Goetzel, P.C.

(57) ABSTRACT

A system comprises an encoder configured to compress and encode data for a three-dimensional dynamic mesh. The three-dimensional dynamic mesh is compressed and signaled using a base-mesh sub-bitstream and an atlas sub-bitstream (e.g., displacement and/or attribute sub-bitstream). The atlas sub-bitstream comprises displacement information to be applied at sub-division points of the base mesh to recreate the three-dimensional dynamic mesh at a given moment in time and may also include attribute values, such as colors, textures, etc. to be applied to the reconstructed mesh. Sub-mesh identifiers are included in tile headers of an atlas sub-bitstream that enable selective reconstruction of sub-meshes. A complimentary decoder decodes a compressed bitstream for the three-dimensional dynamic mesh, encoded such as by the encoder.

20 Claims, 23 Drawing Sheets

(56) References Cited

U.S. PATENT DOCUMENTS

| | | | |
|---|---|---|---|
| 2024/0153150 A1 | 5/2024 | Kim et al. | |
| 2024/0233192 A1* | 7/2024 | Cao | G06T 9/001 |
| 2024/0357164 A1 | 10/2024 | Tian et al. | |
| 2024/0404200 A1 | 12/2024 | Graziosi et al. | |
| 2025/0024050 A1 | 1/2025 | Kondrad et al. | |
| 2025/0104287 A1* | 3/2025 | Kondrad | G06T 9/001 |

FOREIGN PATENT DOCUMENTS

| | | | |
|---|---|---|---|
| JP | 2024152414 | A | 10/2024 |
| JP | 2025009036 | A | 1/2025 |
| WO | 2023172509 | A1 | 9/2023 |
| WO | 2024084326 | A1 | 4/2024 |

OTHER PUBLICATIONS

Koki Mishimot, et al., "[V-DMC] [EE4.11 related] [New] Syntax Proposal for Submesh," 143.MPEG Meeting, Jul. 17, 2023-Jul. 21, 2023; Geneva; (Motion Picture Expert Group or ISO/IEC JTC1/SC29/WG11), No. m64501, Jul. 20, 2023, XP030325448, pp. 1-118.

Mammou, et al., "Video and Subdivision based Mesh Coding," 2022 10th European Workshop on Visual Information Processing, (EUVIP), pp. 1-6, IEEE, 2022.

Kishimoto, et al., "Minimization of Submesh Boundary Errors in Dynamic Mesh Coding," In 2024 IEEE Conference on Image Pocessing (ICIP), pp. 3368-3375, IEEE, 2024.

Zhang, et al., "Optimization Strategy for 3D Mesh Displacement Coding in the V-DMC Standard," In 2024 International Conference on Ubiquitous Communication (Ucom), pp. 212-216, IEEE, 2024.

Choi, et al., "Overview of the Video-based Dynamic Mesh Coding (V-DMC) Standard Work," In 2022 13th Internatonal Conference on Information and Communication Technology Convergence (ICTC), pp. 578-581, IEEE, 2022.

* cited by examiner

| | |
|---|---|
| # link to material library<br>mtllib person_00000001.mtl<br># Positions (e.g. Geometry Information)<br>v 64.062500 1237.739990 51.757801<br>v 59.570301 1236.819946 54.899700<br>...<br>v -104.573997 434.458008 175.684006<br>v 98.071899 744.414978 178.248001<br>v 96.240196 781.739990 178.076004<br>v 95.393799 791.934998 178.188004<br># Texture coordinates<br>vt 0.897381 0.740830<br>vt 0.899059 0.741542<br>...<br>vt 0.548180 0.679136<br># link to material<br>usemtl material0000<br># connectivity for geometry and texture<br>f 1/1 2/2 3/3<br>f 4/7 1/1 3/9<br>...<br>f 4318/4318 3539/3539 16453/16453 | newmtl material0000<br>Ka 1.0 1.0 1.0<br>Kd 1.0 1.0 1.0<br>Ks 1.0 1.0 1.0<br>map_Kd<br># link to a 2D image<br>person_00000001.png |
| person_00000001.obj | person_00000001.mtl |
| Example of a textured mesh stored in OBJ format. | |

FIG. 2

- - - - - Edge to be subdivided
— — - Edge not to be subdivided
—— Edge introduced by the adaptive subdivision process

MESH COMPRESSION WITH BASE MESH INFORMATION SIGNALED IN A FIRST SUB-BITSTREAM AND SUB-MESH INFORMATION SIGNALED WITH DISPLACEMENT INFORMATION IN AN ADDITIONAL SUB-BITSTREAM

PRIORITY CLAIM

This application claims benefit of priority to U.S. Provisional Application Ser. No. 63/588,967, entitled "Mesh Compression with Base Mesh Information Signaled in a First Sub-Bitstream and Sub-Mesh Information Signaled with Displacement Information in an Additional Sub-Bitstream," filed Oct. 9, 2023, and which is incorporated herein by reference in its entirety.

BACKGROUND

Technical Field

This disclosure relates generally to compression and decompression of three-dimensional meshes with associated textures or attributes.

Description of the Related Art

Various types of sensors, such as light detection and ranging (LIDAR) systems, 3-D-cameras, 3-D scanners, etc. may capture data indicating positions of points in three-dimensional space, for example positions in the X, Y, and Z planes. Also, such systems may further capture attribute information in addition to spatial information for the respective points, such as color information (e.g., RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit. Also, three-dimensional visual content may also be captured in other ways, such as via 2D images of a scene captured from multiple viewing positions relative to the scene.

Such three-dimensional visual content may be represented by a three-dimensional mesh comprising a plurality of polygons with connected vertices that models a surface of three-dimensional visual content, such as a surface of a point cloud. Moreover, texture or attribute values of points of the three-dimensional visual content may be overlaid on the mesh to represent the attribute or texture of the three-dimensional visual content when modelled as a three-dimensional mesh.

Additionally, a three-dimensional mesh may be generated, for example in software, without first being modelled as a point cloud or other type of three-dimensional visual content. For example, the software may directly generate the three-dimensional mesh and apply texture or attribute values to represent an object.

SUMMARY OF EMBODIMENTS

In some embodiments, a decoder system includes one or more computing devices storing program instructions that, when executed by the one or more computing devices, cause the one or more computing devices to receive a bitstream representing a compressed mesh. The bitstream includes a base mesh sub-bitstream and an atlas sub-bitstream. The atlas sub-bitstream includes displacement values for a plurality of vertices to be included at subdivision location of the base mesh in a reconstructed version of the mesh, as well as sub-mesh identifiers for identifying respective sets of the displacement values that correspond to respective ones of a plurality of sub-meshes of the mesh. The decoder system is further configured to parse the atlas sub-bitstream to locate displacement vectors corresponding to a given sub-mesh that is to be reconstructed and reconstruct the given sub-mesh while refraining from reconstructing one or more other sub-meshes of the bitstream that have not been selected to be reconstructed.

In some embodiments, an encoder system includes one or more computing devices storing program instructions that when executed by the one or more computing devices, cause the one or more computing devices receive three-dimensional visual content to be encoded using video-based dynamic mesh compression and generate an encoded bitstream comprising a base mesh sub-bitstream comprising encoded mesh information for a base mesh and an atlas sub-bitstream comprising displacement values for a plurality of vertices to be included at subdivision location of the base mesh in a reconstructed version of the mesh. Also, the atlas sub-bitstream comprises sub-mesh identifiers for identifying respective sets of the displacement values that correspond to respective ones of a plurality of sub-meshes of the mesh.

In some embodiments, a system includes one or more sensors configured to capture points representing an object in a view of the sensor and to capture texture or attribute values associated with the points of the object. The system also includes one or more computing devices storing program instructions, that when executed, cause the one or more computing devices to generate a three-dimensional mesh that models the points of the object using vertices and connections between the vertices that define polygons of the three-dimensional mesh. Also, in some embodiments, a three-dimensional mesh may be generated without first being captured by one or more sensors. For example, a computer graphics program may directly generate a three-dimensional mesh with an associated texture or associated attribute values to represent an object in a scene, without necessarily generating a point cloud or other type of three-dimensional visual content that represents the object.

In some embodiments, the encoder system includes one or more computing devices storing program instructions that when executed by the one or more computing devices, further cause the one or more computing devices to determine a plurality of patches for the attributes of three-dimensional mesh and a corresponding attribute map that maps the attribute patches to the geometry of the mesh.

The encoder system may further encode the geometry of the mesh by encoding a base mesh and displacements of vertices relative to the base mesh. A compressed bitstream may include a compressed base mesh, compressed displacement values, and compressed attribute information.

In some embodiments, sub-meshes may be indicated in the bitstream, wherein a sub-mesh corresponds to a sub-unit of a larger mesh encoded in the bitstream. For example, three-dimensional content may include a mesh representing a person's face and, as an example, the nose portion of the person's face may be represented using a sub-mesh, wherein the sub-mesh is part of a larger mesh, such as a mesh representing the person's face. Thus, several sub-meshes may be part of a larger mesh. The sub-meshes may be indicated in a base mesh sub-bitstream of the bitstream, wherein the different sub-meshes are signaled separately in the base mesh sub-bitstream or are otherwise identifiable in the base mesh sub-bitstream. However, in the atlas sub-bitstream it may be more efficient to signal displacement data and/or attribute data for multiple sub-meshes using shared video frames. For example, patches corresponding to more than one sub-mesh may be packed into the same video frame.

Also, in some embodiments, only a sub-set of the sub-meshes of the bitstream may need to be reconstructed and/or rendered. In order to selectively render only a sub-set of the sub-meshes, it may be necessary to parse the atlas sub-bitstream to separate out patches corresponding to a given sub-mesh from other patches included in the same video frame(s) that correspond to other sub-meshes that are not being selectively rendered.

In some embodiments, tile headers included in the atlas sub-bitstream include sub-mesh identifiers, such as sub-mesh IDs and/or sub-mesh index references, that allow a decoder to parse the atlas sub-bitstream and efficiently locate patches corresponding to a given sub-mesh without having to fully reconstruct other sub-meshes that have not been selected for reconstruction.

BRIEF DESCRIPTION OF THE DRAWINGS

FIG. 2 illustrates an alternative example of input information for defining a three-dimensional mesh, wherein the input information is formatted according to an object format, according to some embodiments.

Figure 1:
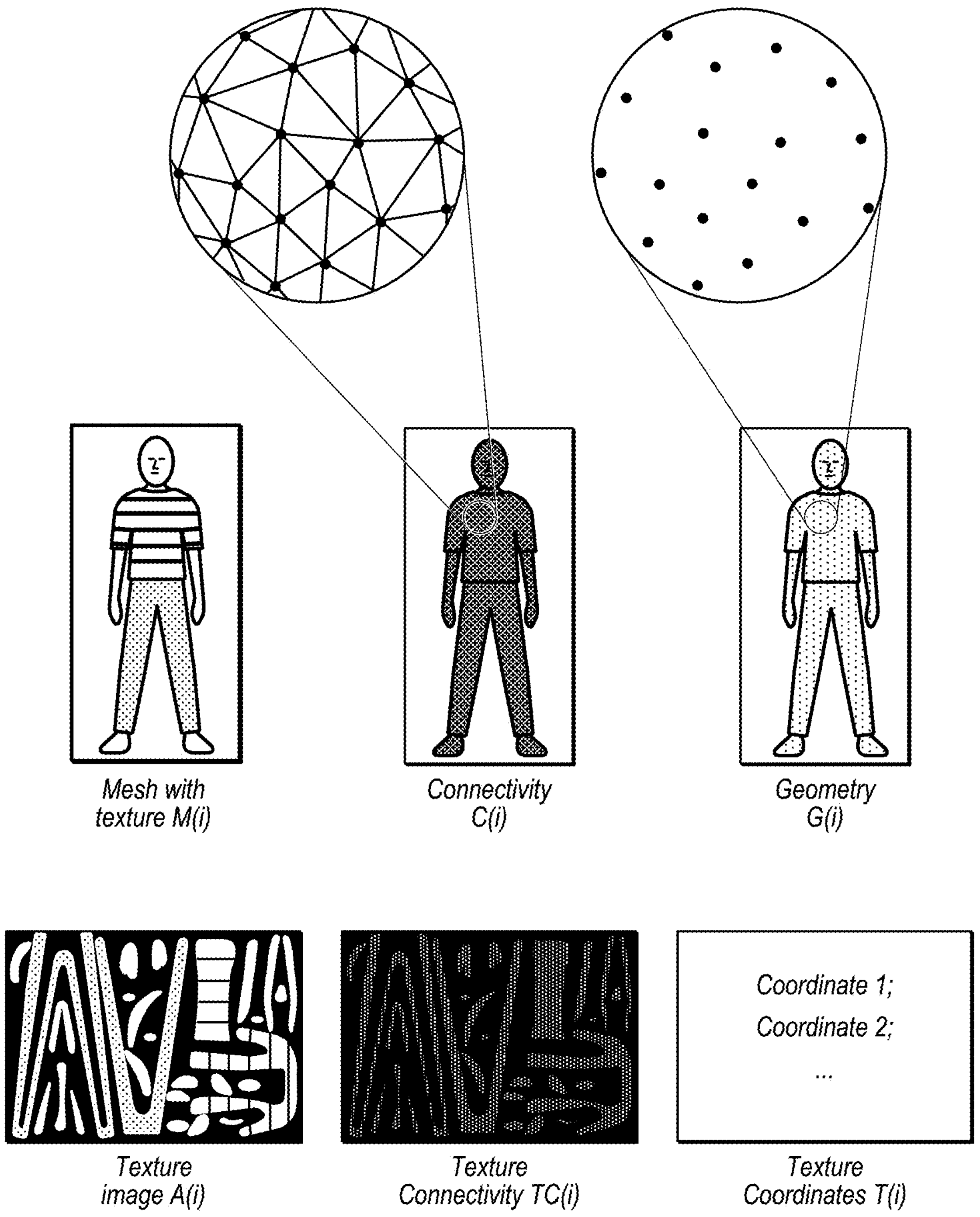
FIG. 1 illustrates example input information for defining a three-dimensional mesh, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture volumetric content comprising thousands or millions of points in 2-D or 3-D space, such as via LIDAR systems, has increased. Also, the development of advanced display technologies, such as virtual reality or augmented reality systems, has increased potential uses for volumetric content. However, volumetric content files are often very large and may be costly and time-consuming to store and transmit. For example, communication of volumetric content over private or public networks, such as the Internet, may require considerable amounts of time and/or network resources, such that some uses of volumetric content, such as real-time uses, may be limited. Also, storage requirements of volumetric content files may consume a significant amount of storage capacity of devices storing the volumetric content files, which may also limit potential applications for using volumetric content data.

In some embodiments, an encoder may be used to generate compressed volumetric content to reduce costs and time associated with storing and transmitting large volumetric content files. In some embodiments, a system may include an encoder that compresses attribute and/or spatial information of volumetric content such that the volumetric content file may be stored and transmitted more quickly than non-compressed volumetric content and in a manner that the volumetric content file may occupy less storage space than non-compressed volumetric content.

In some embodiments, such encoders and decoders (or other encoders and decoders) described herein may be adapted to additionally or alternatively encode three-degree of freedom plus (3DOF+) scenes, visual volumetric content, such as MPEG V3C scenes, immersive video scenes, such as MPEG MIV, etc.

In some embodiments, a dynamic mesh that is to be compressed and/or encoded may include a set of 3D Meshes M(0), M(1), M(2), . . . , M(n). Such as multiple representations of a dynamic mesh at different points in time (i). Each mesh M(i) may be defined by be a connectivity information C(i), a geometry information G(i), texture coordinates T(i) and texture connectivity TC(i). For each mesh M(i), one or multiple 2D images A(i, 0), A(i, 1) . . . , A(i, D−1) describing the textures or attributes associated with the mesh may be included. For example, FIG. 1 illustrates an example dynamic mesh M(i) comprising connectivity information C(i), geometry information G(i), texture images A(i), texture connectivity information TC(i), and texture coordinates information T(i). Also, FIG. 2 illustrates an example of a textured mesh stored in object (OBJ) format.

For example, the example textured mesh stored in the object format shown in FIG. 2 includes geometry information listed as X, Y, and Z coordinates of vertices and texture coordinates listed as two dimensional (2D) coordinates for vertices, wherein the 2D coordinates identify a pixel location of a pixel storing texture information for a given vertex. The example texture mesh stored in the object format also includes texture connectivity information that indicates mappings between the geometry coordinates and texture coordinates to form polygons, such as triangles. For example, a first triangle is formed by three vertices, where a first vertex (1/1) is defined as the first geometry coordinate (e.g., 64.062500, 1237.739990, 51.757801), which corresponds with the first texture coordinate (e.g., 0.0897381, 0.740830). The second vertex (2/2) of the triangle is defined as the second geometry coordinate (e.g., 59.570301, 1236.819946, 54.899700), which corresponds with the second texture coordinate (e.g., 0.899059, 0.741542). Finally, the third vertex of the triangle corresponds to the third listed geometry coordinate which matches with the third listed texture coordinate. However, note that in some instances a vertex of a polygon, such as a triangle may map to a set of geometry coordinates and texture coordinates that may have different index positions in the respective lists of geometry coordinates and texture coordinates. For example, the second triangle has a first vertex corresponding to the fourth listed set of geometry coordinates and the seventh listed set of texture coordinates. A second vertex corresponding to the first listed set of geometry coordinates and the first set of listed texture coordinates and a third vertex corresponding to the third listed set of geometry coordinates and the ninth listed set of texture coordinates.

In some embodiments, the geometry information G(i) may represent locations of vertices of the mesh in 3D space and the connectivity C(i) may indicate how the vertices are to be connected together to form polygons that make up the mesh M(i). Also, the texture coordinates T(i) may indicate locations of pixels in a 2D image that correspond to vertices of a corresponding sub-mesh. Attribute patch information may indicate how the texture coordinates defined with respect to a 2D bounding box map into a three-dimensional space of a 3D bounding box associated with the attribute patch based on how the points were projected onto a projection plane for the attribute patch. Also, the texture connectivity information TC(i) may indicate how the vertices represented by the texture coordinates T(i) are to be connected together to form polygons of the sub-meshes. For example, each texture or attribute patch of the texture image A(i) may correspond to a corresponding sub-mesh defined using texture coordinates T(i) and texture connectivity TC(i).

In some embodiments, a mesh encoder may perform a patch generation process, wherein the mesh is subdivided into a set of sub-meshes, and respective ones of the submeshes are represented using sets of patches. The sub-meshes may correspond to the connected components of the texture connectivity or may be different sub-meshes than the texture connectivity of the mesh. In some embodiments, a number and a size of sub-meshes to be determined may be adjusted to balance discontinuities and flexibility to update the mesh, such as via inter-prediction. For example, smaller sub-meshes may allow for a finer granularity of updates to change a particular region of a mesh, such as at a subsequent moment in time using an inter-prediction process. But, a higher number of sub-meshes may introduce more discontinuities.

Figure 3:
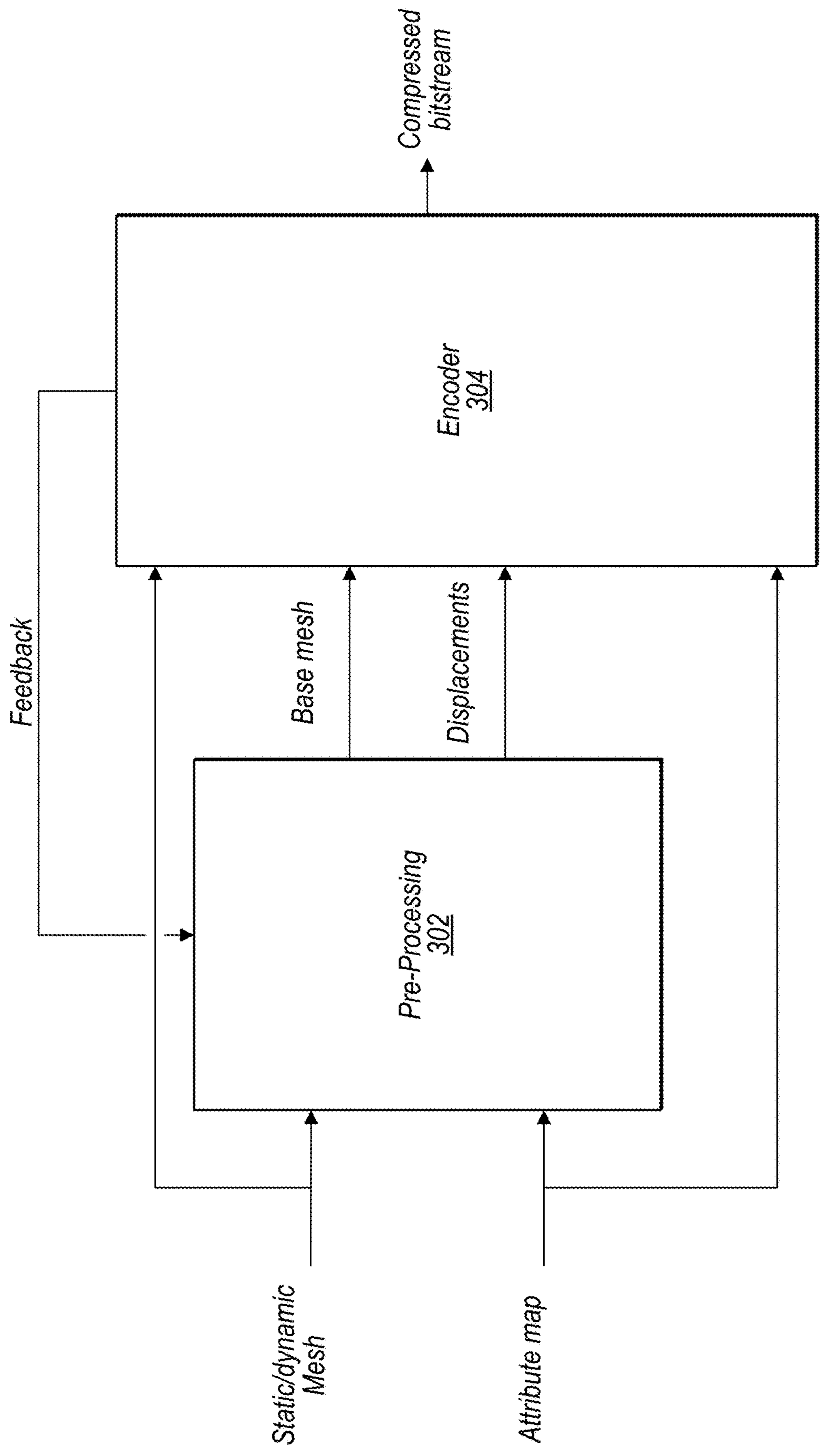
FIG. 3 illustrates an example pre-processor and encoder for encoding a three-dimensional mesh, according to some embodiments.

FIG. 3 illustrates a high-level block-diagram of an encoding process in some embodiments. Note that the feedback loop during the encoding process makes it possible for the encoder to guide the pre-processing step and change its parameters to achieve the best possible compromise according to various criteria, such as: rate-distortion, encoding/decoding complexity, random access, reconstruction complexity, terminal capabilities, encoder/decoder power consumption, network bandwidth and latency, and/or other factors.

Figure 4:
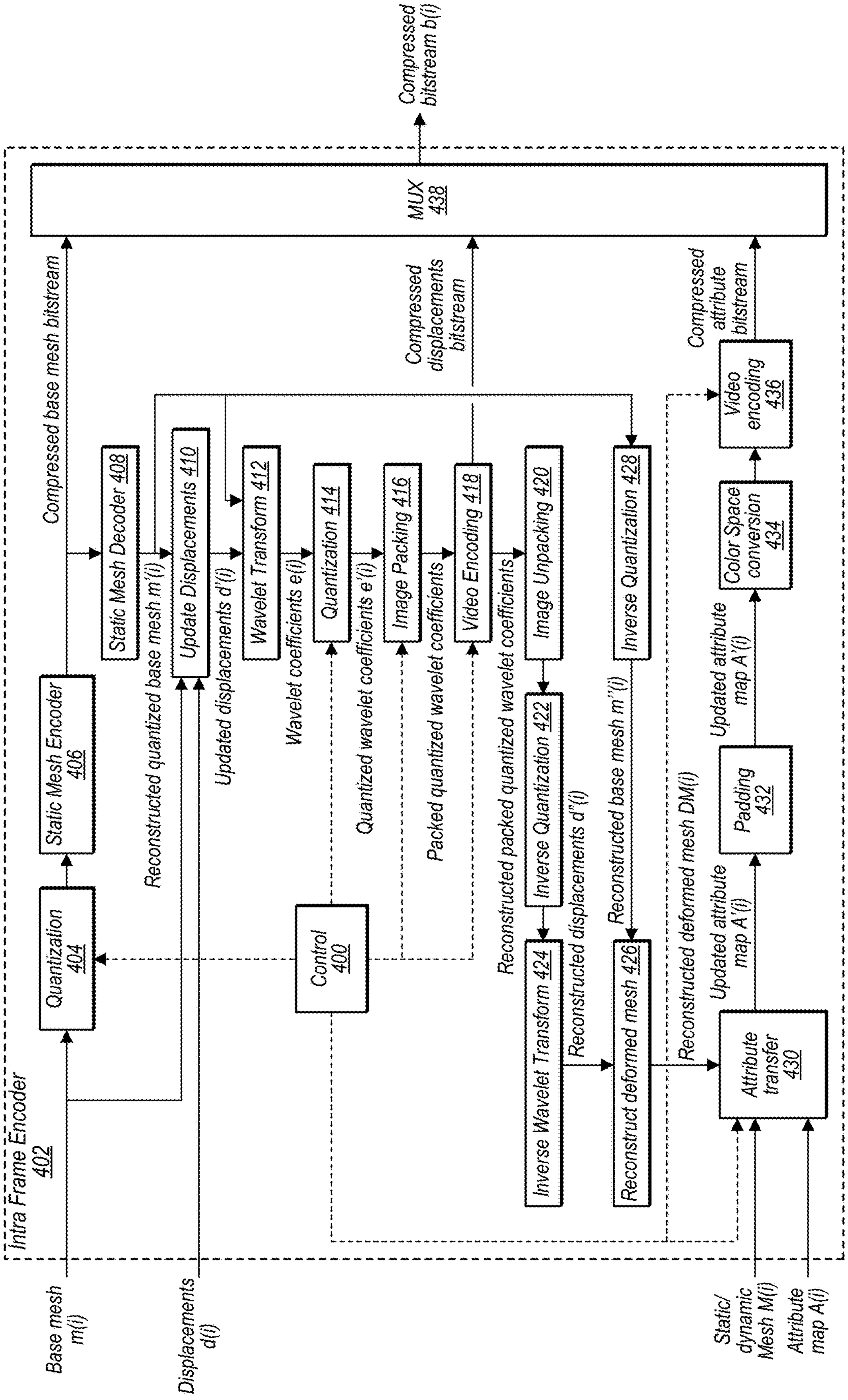
FIG. 4 illustrates a more-detailed view of an example intra-frame encoder, according to some embodiments.
Figure 5:
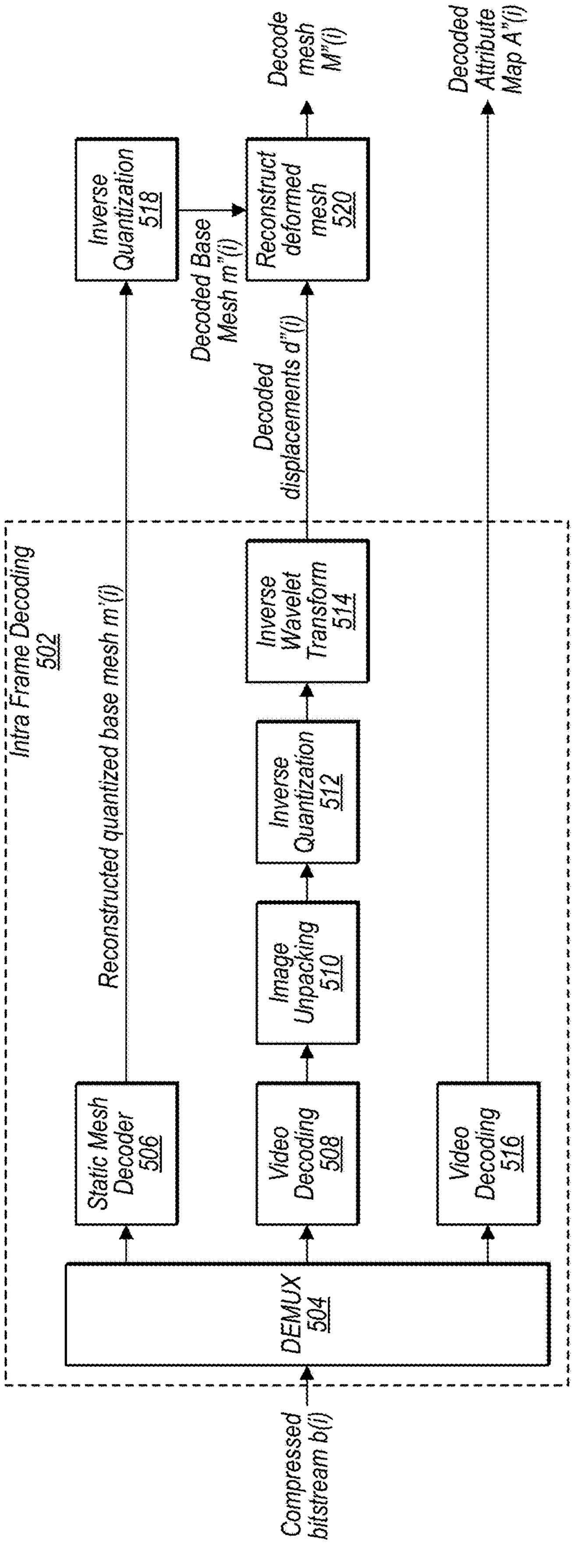
FIG. 5 illustrates an example intra-frame decoder for decoding a three-dimensional mesh, according to some embodiments.

A mesh that could be either static or dynamic is received at pre-processing 302. Also, an attribute map representing how attribute images (e.g., texture images) for the static/dynamic mesh are to be mapped to the mesh is received at pre-processing module 302. For example, the attribute map may include texture coordinates and texture connectivity for texture images for the mesh. The pre-processing module 302 separates the static/dynamic mesh into a base mesh and displacements. Where the displacements represent how vertices are to be displaced to re-create the original static/dynamic mesh from the base mesh. For example, in some embodiments, vertices included in the original static/dynamic mesh may be omitted from the base mesh (e.g., the base mesh may be a compressed version of the original static/dynamic mesh). As will be discussed in more detail below, a decoder may predict additional vertices to be added to the base mesh, for example by sub-dividing edges between remaining vertices included in the base mesh. In such an example, the displacements may indicate how the additional vertices are to be displaced, wherein the displacement of the added vertices modifies the base mesh to better represent the original static/dynamic mesh. For example, FIG. 4 illustrates a detailed intra frame encoder 402 that may be used to encode a base mesh and displacements for added vertices. For dynamic meshes, an inter frame encoder, such as shown in FIG. 5 may be used. As can be seen in FIG. 5, instead of signaling a new base mesh for each frame, instead a base mesh for a current time frame can be compared to a reconstructed quantized reference base mesh m'(e.g., the base mesh the decoder will see from the previous time frame) and motion vectors to represent how the current base mesh has changed relative to the reference base mesh may be encoded in lieu of encoding a new base mesh for each frame. Note that the motion vectors may not be encoded directly but may be further compressed to take advantage of relationships between the motion vectors.

Figure 6:
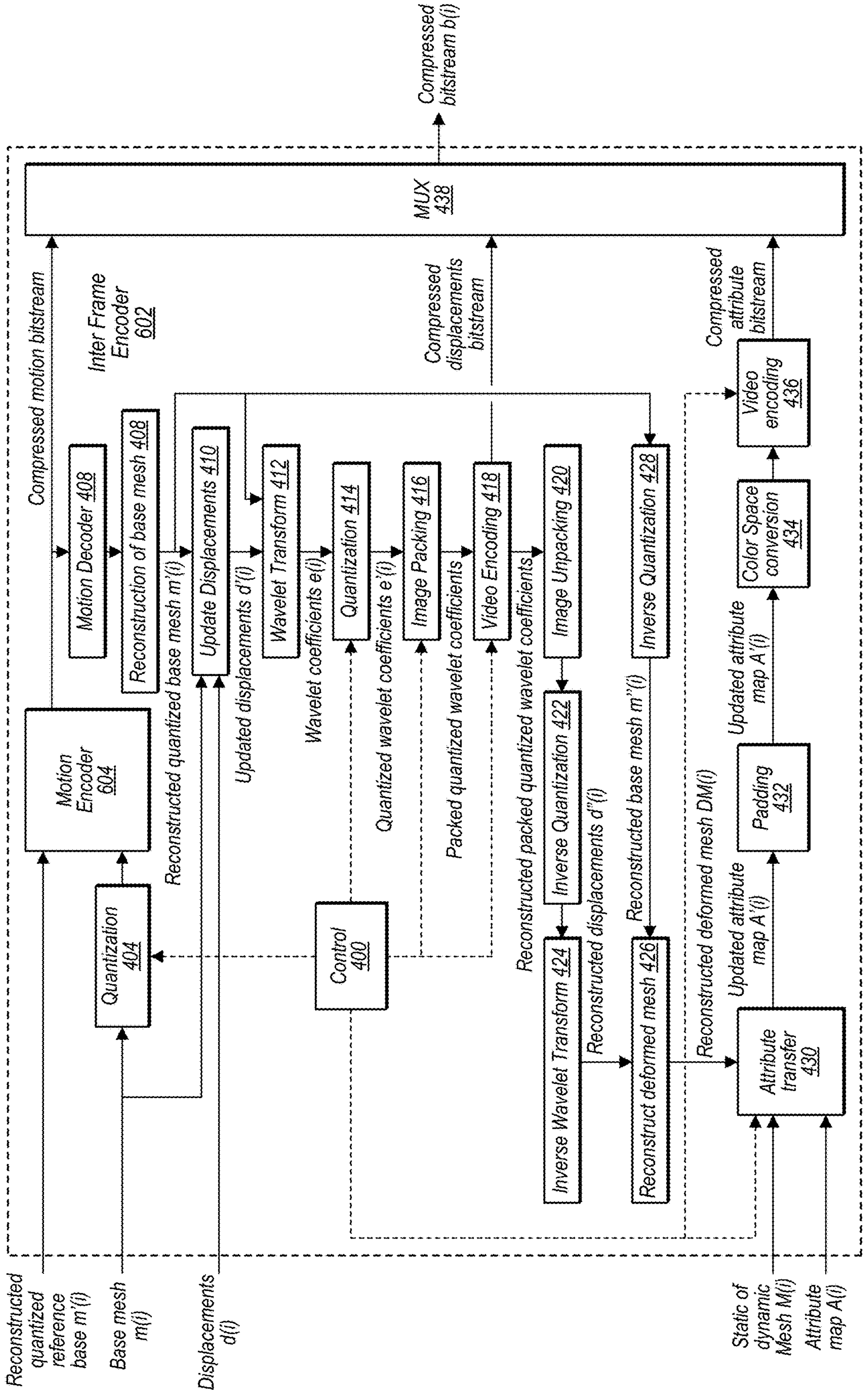
FIG. 6 illustrates a more-detailed view of an example inter-frame encoder, according to some embodiments.

The separated base mesh m and displacements that have been separated by pre-processing module 302 are provided to encoder 304, which may be an intra-frame encoder as shown in FIG. 4 or an inter-frame encoder as shown in FIG. 6. Also, the attribute map is provided to the encoder 304. In some embodiments, the original static/dynamic mesh may also be provided to the encoder 304, in addition to the separated out base mesh and displacements. For example, the encoder 304 may compare a reconstructed version of the static/dynamic mesh (that has been reconstructed from the base mesh and displacements) in order to determine geometric distortion. In some embodiments, an attribute transfer process may be performed to adjust the attribute values of the attribute images to account for this slight geometric distortion. In some embodiments, feedback may be provided back to pre-processing 302, for example to reduce distortion, by changing how original static/dynamic mesh is decimated to generate the base mesh. Note that in some embodiments an intra-frame encoder and an inter-frame encoder may be combined into a single encoder that includes logic to toggle between intra-frame encoding and inter-frame encoding. The output of the encoder 304 is a compressed bitstream representing the original static/dynamic mesh and its associated attributes/textures.

With regard to mesh decimation, in some embodiments, a portion of a surface of a static/dynamic mesh may be thought of as an input 2D curve (represented by a 2D polyline), referred to as an "original" curve. The original curve may be first down-sampled to generate a base curve/polyline, referred to as a "decimated" curve. A subdivision scheme, such as those described herein, may then be applied to the decimated polyline to generate a "subdivided" curve. For instance, a subdivision scheme using an iterative interpolation scheme may be applied. The subdivision scheme may include inserting at each iteration a new point in the middle of each edge of the polyline. The inserted points represent additional vertices that may be moved by the displacements.

For example, the subdivided polyline is then deformed to get a better approximation of the original curve. More precisely, a displacement vector is computed for each vertex of the subdivided mesh such that the shape of the displaced curve approximates the shape of the original curve. An advantage of the subdivided curve is that it has a subdivision structure that allows efficient compression, while it offers a faithful approximation of the original curve. The compression efficiency is obtained thanks to the following properties:

- The decimated/base curve has a low number of vertices and requires a limited number of bits to be encoded/transmitted.
- The subdivided curve is automatically generated by the decoder once the base/decimated curve is decoded (e.g., no need to signal or hardcode at the decoder any information other than the subdivision scheme type and subdivision iteration count).
- The displaced curve is generated by decoding and applying the displacement vectors associated with the subdivided curve vertices. Besides allowing for spatial/quality scalability, the subdivision structure enables efficient wavelet decomposition, which offers high compression performance (e.g., with respect to rate-distortion performance).

For example, FIG. 4 illustrates a more-detailed view of an example intra-frame encoder, according to some embodiments.

In some embodiments, intra-frame encoder 402 receives base mesh m(i), displacements d(i), the original static/dynamic mesh M(i) and attribute map A(i). The base mesh m(i) is provided to quantization module 404, wherein aspects of the base mesh may (optionally) be further quantized. In some embodiments, various mesh encoders may be used to encode the base mesh. Also, in some embodiments, intra-frame encoder 402 may allow for customization, wherein different respective mesh encoding schemes may be used to encode the base mesh. For example, static mesh encoder 406 may be a selected mesh encoder selected from a set of viable mesh encoder, such as a DRACO encoder (or another suitable encoder). The encoded base mesh, that has been encoded by static mesh encoder 406 is provided to multiplexer (MUX) 438 for inclusion in the compressed bitstream b(i). In some embodiments, sub-meshes may be encoded as separate statically encoded meshes in the base mesh sub-bitstream. Additionally, the encoded base mesh is provided to static mesh decoder in order to generate a reconstructed version of the base mesh (that a decoder will see). This reconstructed version of the base mesh is used to update the displacements d(i) to take into account any geometric distortion between the original base mesh and a reconstructed version of the base mesh (that a decoder will see). For example, static mesh decoder 408 generates reconstructed quantized base mesh m'(i) and provides the reconstructed quantized base mesh m'(i) to displacement update module 410, which also receives the original base mesh and the original displacement d(i). The displacement update module 410 compares the reconstructed quantized base mesh m'(i) (that the decoder will see) to the base mesh m(i) and adjusts the displacements d(i) to account for differences between the base mesh m(i) and the reconstructed quantized base mesh m'(i). These updated displacements d'(i) are provided to wavelet transform 412 which applies a wavelet transformation to further compress the updated displacements d'(i) and outputs wavelet coefficients e(i), which are provided to quantization module 414 which generates quantized wavelet coefficients e'(i). The quantized wavelet coefficients may then be packed into a 2D image frame via image packing module 416, wherein the packed 2D image frame is further video encoded via video encoding 418. The encoded video images are also provided to multiplexer (MUX) 438 for inclusion in the compressed bitstream b(i). Also, in some embodiments, the displacement values (such as are indicated in the generated quantized wavelet coefficients e'(i) or indicated using other compression schemes) may be encoded at least partially outside of the video sub-bitstream, such as in their own displacement data sub-bitstream, in the base mesh sub-bitstream, or in an atlas data sub-bitstream. Note that the atlas sub-bitstream includes both the atlas data sub-bitstream and the video sub-bitstream, wherein the atlas data sub-bitstream includes information for identifying patches included in the video sub-bitstream.

In addition, in order to account for any geometric distortion introduced relative to the original static/dynamic mesh, an attribute transfer process 430 may be used to modify attributes to account for differences between a reconstructed deformed mesh DM(i) and the original static/dynamic mesh.

For example, video encoding 418 may further perform video decoding (or a complimentary video-decoding module may be used (which is not shown in FIG. 4)). This produces reconstructed packed quantized wavelet coefficients that are unpacked via image unpacking module 420. Furthermore, inverse quantization may be applied via inverse quantization module 422 and inverse wavelet transform 424 may be applied to generate reconstructed displacements d"(i). Also, the reconstructed quantized base mesh m'(i) that was generated by static mesh decoder 408 may be inverse quantized via inverse quantization module 428 to generate reconstructed base mesh m"(i). The reconstructed deformed mesh generation module 426 applies the reconstructed displacements d"(i) to the reconstructed base mesh m"(i) to generate reconstructed deformed mesh DM(i). Note that the reconstructed deformed mesh DM(i) represents the reconstructed mesh that a decoder will generate, and accounts for any geometric deformation resulting from losses introduced in the encoding process.

Attribute transfer module 430 compares the geometry of the original static/dynamic mesh M(i) to the reconstructed deformed mesh DM(i) and updates the attribute map to account for any geometric deformations, this updated attribute map is output as updated attribute map A'(i). The updated attribute map A'(i) is then padded, wherein a 2D image comprising the attribute images is padded such that spaces not used to communicate the attribute images have a padding applied. In some embodiments, a color space conversion is optionally applied at color space conversion module 434. For example, an RGB color space used to represent color values of the attribute images may be converted to a YCbCr color space, also color space sub-sampling may be applied such as 4:2:0, 4:0:0, etc. color space sub-sampling. The updated attribute map A'(i) that has been padded and optionally color space converted is then video encoded via video encoding module 436 and is provided to multiplexer 438 for inclusion in compressed bitstream b(i).

In some embodiments, a controller 400 may coordinate the various quantization and inverse quantization steps as well as the video encoding and decoding steps such that the inverse quantization "undoes" the quantization and such that the video decoding "undoes" the video encoding. Also, the attribute transfer module 430 may take into account the level of quantization being applied based on communications from the controller 400.

FIG. 5 illustrates an example intra-frame decoder for decoding a three-dimensional mesh, according to some embodiments.

Intra frame decoder 502 receives a compressed bitstream b(i), such as the compressed bitstream generated by the intra frame encoder 402 shown in FIG. 4. Demultiplexer (DEMUX) 504 parses the bitstream into a base mesh sub-component, a displacement sub-component, and an attribute map sub-component. Note that the displacement sub-component and the attribute map sub-component may be included together as parts of an atlas sub-bitstream of the bitstream. Static mesh decoder 506 decodes the base mesh sub-component to generate a reconstructed quantized base mesh m'(i), which is provided to inverse quantization module 518, which in turn outputs decoded base mesh m"(i) and provides it to reconstructed deformed mesh generator 520.

Also, the displacement sub-component of the bitstream is provided to video decoding 508, wherein video encoded image frames are video decoded and provided to image unpacking 510. Image unpacking 510 extracts the packed displacements from the video decoded image frame and provides them to inverse quantization 512 wherein the displacements are inverse quantized. Also, the inverse quantized displacements are provided to inverse wavelet transform 514, which outputs decoded displacements d"(i). Reconstructed deformed mesh generator 520 applies the decoded displacements d"(i) to the decoded base mesh m"(i) to generate a decoded static/dynamic mesh M"(i). Also, the attribute map sub-component is provided to video decoding 516, which outputs a decoded attribute map A"(i). A reconstructed version of the three-dimensional visual content can then be rendered at a device associated with the decoder using the decoded mesh M"(i) and the decoded attribute map A"(i).

As shown in FIG. 5, a bitstream is de-multiplexed into three or more separate sub-bitstreams:

- base mesh sub-bitstream,
- displacement sub-bitstream for positions and potentially for each vertex attribute (also referred to as geometry atlas sub-bitstream), and attribute map sub-bitstream for each attribute map (also referred to as the attribute atlas sub-bitstream).

Figure 13:
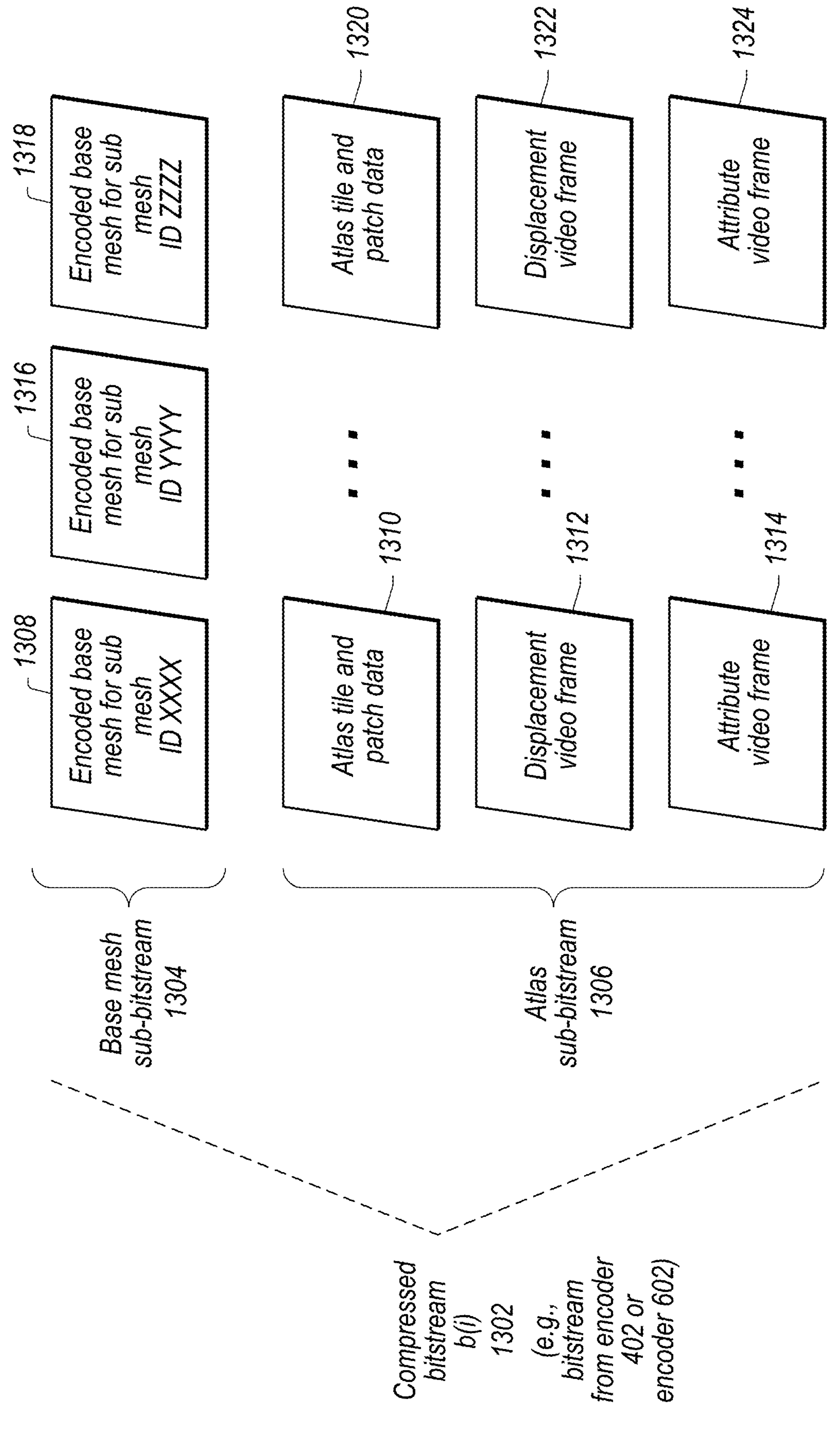
FIG. 13 illustrates example components of a compressed bitstream, according to some embodiments.

In some embodiments, these three sub-streams may be referred to as the base mesh sub-bitstream and the atlas sub-bitstream, wherein the atlas sub-bitstream includes the displacements, such as shown in FIG. 13, as well as the attributes, also as shown in FIG. 13.

The base mesh sub-bitstream is fed to the mesh decoder to generate the reconstructed quantized base mesh m'(i). The decoded base mesh m"(i) is then obtained by applying inverse quantization to m'(i). The proposed scheme is agnostic of which mesh codec is used. The mesh codec used could be specified explicitly in the bitstream or could be implicitly defined/fixed by the specification or the application.

The displacement sub-bitstream could be decoded by a video/image decoder. The generated image/video is then un-packed and inverse quantization is applied to the wavelet coefficients. In an alternative embodiment, the displacements could be decoded by dedicated displacement data decoder. The proposed scheme is agnostic of which codec/standard is used. Image/video codecs such as [HEVC][AVC][AV1][AV2][JPEG][JPEG2000] could be used. The motion decoder used for decoding mesh motion information or a dictionary-based decoder such as ZIP could be for example used as the dedicated displacement data decoder. The decoded displacement d"(i) is then generated by applying the inverse wavelet transform to the unquantized wavelet coefficients. The final decoded mesh is generated by applying the reconstruction process to the decoded base mesh m"(i) and adding the decoded displacement field d"(i).

The attribute sub-bitstream is directly decoded by the video decoder and the decoded attribute map A"(i) is generated as output. The proposed scheme is agnostic of which codec/standard is used. Image/video codecs such as [HEVC][AVC][AV1][AV2][JPEG][JPEG2000] could be used. Alternatively, an attribute sub-bitstream could be decoded by using non-image/video decoders (e.g., using a dictionary-based decoder such as ZIP). Multiple sub-streams, each associated with a different attribute map, could be decoded. Each sub-stream could use a different codec.

FIG. 6 illustrates a more-detailed view of an example inter-frame encoder, according to some embodiments.

In some embodiments, inter frame encoder 602 may include similar components as the intra-frame encoder 402, but instead of encoding a base mesh, the inter-frame encoder may encode motion vectors that can be applied to a reference mesh to generate, at a decoder, a base mesh.

For example, in the case of dynamic meshes, a temporally consistent re-meshing process is used, which may produce a same subdivision structure that is shared by the current mesh M'(i) and a reference mesh M'(j). Such a coherent temporal re-meshing process makes it possible to skip the encoding of the base mesh m(i) and re-use the base mesh m(j) associated with the reference frame M(j). This could also enable better temporal prediction for both the attribute and geometry information. More precisely, a motion field f(i) describing how to move the vertices of m(j) to match the positions of m(i) may be computed and encoded. Such process is described in FIG. 6. For example, motion encoder 406 may generate the motion field f(i) describing how to move the vertices of m(j) to match the positions of m(i).

In some embodiments, the base mesh m(i) associated with the current frame is first quantized (e.g., using uniform quantization) and encoded by using a static mesh encoder. The proposed scheme is agnostic of which mesh codec is used. The mesh codec used could be specified explicitly in the bitstream by encoding a mesh codec ID or could be implicitly defined/fixed by the specification or the application.

Depending on the application and the targeted bitrate/visual quality, the encoder could optionally encode a set of displacement vectors associated with the subdivided mesh vertices, referred to as the displacement field d(i).

The reconstructed quantized base mesh m'(i) (e.g., output of reconstruction of base mesh 408) is then used to update the displacement field d(i) (at update displacements module 410) to generate an updated displacement field d'(i) so it takes into account the differences between the reconstructed base mesh m'(i) and the original base mesh m(i). By exploiting the subdivision surface mesh structure, a wavelet transform is then applied, at wavelet transform 412, to d'(i) and a set of wavelet coefficients are generated. The wavelet coefficients are then quantized, at quantization 414, packed into a 2D image/video (at image packing 416), and compressed by using an image/video encoder (at video encoding 418). The encoding of the wavelet coefficients may be lossless or lossy. The reconstructed version of the wavelet coefficients is obtained by applying image unpacking and inverse quantization to the reconstructed wavelet coefficients video generated during the video encoding process (e.g., at 420, 422, and 424). Reconstructed displacements d"(i) are then computed by applying the inverse wavelet transform to the reconstructed wavelet coefficients. A reconstructed base mesh m"(i) is obtained by applying inverse quantization to the reconstructed quantized base mesh m'(i). The reconstructed deformed mesh DM(i) is obtained by subdividing m"(i) and applying the reconstructed displacements d"(i) to its vertices.

Since the quantization step or/and the mesh compression module may be lossy, a reconstructed quantized version of m(i), denoted as m'(i), is computed. If the mesh information is losslessly encoded and the quantization step is skipped, m(i) would exactly match m'(i).

As shown in FIG. 6, a reconstructed quantized reference base mesh m'(j) is used to predict the current frame base mesh m(i). The pre-processing module 302 described in FIG. 3 could be configured such that m(i) and m(j) share the same:

- number of vertices,
- connectivity,
- texture coordinates, and
- texture connectivity.

The motion field f(i) is computed by considering the quantized version of m(i) and the reconstructed quantized base mesh m'(j). Since m'(j) may have a different number of vertices than m(j) (e.g., vertices may get merged/removed), the encoder keeps track of the transformation applied to m(j) to get m'(j) and applies it to m(i) to guarantee a 1-to-1 correspondence between m'(j) and the transformed and quantized version of m(i), denoted m*(i). The motion field f(i) is computed by subtracting the quantized positions p(i, v) of the vertex v of m*(i) from the positions p(j, v) of the vertex v of m'(j):

$$f(i, v) = p(i, v) - p(j, v)$$

The motion field is then further predicted by using the connectivity information of m'(j) and is entropy encoded (e.g., context adaptive binary arithmetic encoding could be used).

Since the motion field compression process could be lossy, a reconstructed motion field denoted as f'(i) is computed by applying the motion decoder module 408. A reconstructed quantized base mesh m'(i) is then computed by adding the motion field to the positions of m'(j). The remaining of the encoding process is similar to the Intra frame encoding.

Figure 7:
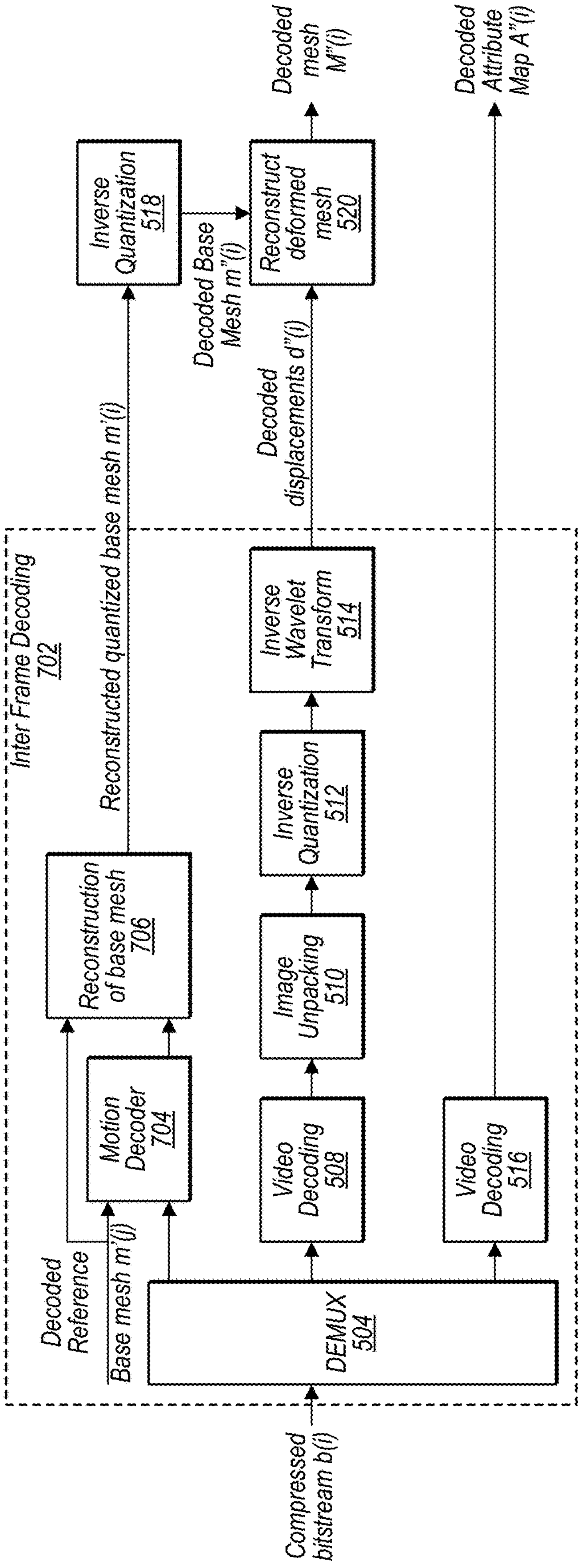
FIG. 7 illustrates an example inter-frame decoder for decoding a three-dimensional mesh, according to some embodiments.

FIG. 7 illustrates an example inter-frame decoder for decoding a three-dimensional mesh, according to some embodiments.

Inter frame decoder 702 includes similar components as intra frame decoder 502 shown in FIG. 5. However, instead of receiving a directly encoded base mesh, the inter frame decoder 702 reconstructs a base mesh for a current frame based on motion vectors of a displacement field relative to a reference frame. For example, inter-frame decoder 702 includes motion field/vector decoder 704 and reconstruction of base mesh module 706.

In a similar manner to the intra-frame decoder, the inter-frame decoder 702 separates the bitstream into three separate sub-streams:

- a motion sub-stream (e.g. base mesh sub-bitstream for inter encoding),
- a displacement sub-stream (e.g. of an atlas sub-bitstream), and
- an attribute sub-stream (e.g. of an atlas sub-bitstream).

The motion sub-stream is decoded by applying the motion decoder 704. The proposed scheme is agnostic of which codec/standard is used to decode the motion information. For instance, any motion decoding scheme could be used. The decoded motion is then optionally added to the decoded reference quantized base mesh m'(j) to generate the reconstructed quantized base mesh m'(i), i.e., the already decoded mesh at instance j can be used for the prediction of the mesh at instance i. Afterwards, the decoded base mesh m"(i) is generated by applying the inverse quantization to m'(i).

The displacement and attribute sub-streams are decoded in a similar manner as in the intra frame decoding process described with regard to FIG. 5. The decoded mesh M"(i) is also reconstructed in a similar manner.

The inverse quantization and reconstruction processes are not normative and could be implemented in various ways and/or combined with the rendering process.

Divisions of the Mesh and Controlling Encoding to Avoid Cracks

In some embodiments, the mesh may be sub-divided into a set of patches (e.g., sub-parts) and the patches may potentially be grouped into groups of patches, such as a set of patch groups/tiles. In such embodiments, different encoding parameters (e.g., subdivision, quantization, wavelets transform, coordinates system . . . ) may be used to compress each patch or tile. In some embodiments, in order to avoid cracks at patch boundaries, lossless coding may be used for boundary vertices. Also, quantization of wavelet coefficients for boundary vertices may be disabled, along with using a local coordinate system for boundary vertices.

In some embodiments, scalability may be supported at different levels. For example, temporal scalability may be achieved through temporal sub-sampling and frame re-ordering. Also, quality and spatial scalability may be achieved by using different mechanisms for the geometry/vertex attribute data and the attribute map data. Also, region of interest (ROI) reconstruction may be supported. For example, the encoding process described in the previous sections could be configured to encode an ROI with higher resolution and/or higher quality for geometry, vertex attribute, and/or attribute map data. This is particularly useful to provide a higher visual quality content under tight bandwidth and complexity constraints (e.g., higher quality for the face vs rest of the body). Priority/importance/spatial/bounding box information could be associated with patches, patch groups, tiles, network abstraction layer (NAL) units, and/or sub-bitstreams in a manner that allows the decoder to adaptively decode a subset of the mesh based on the viewing frustum, the power budget, or the terminal capabilities. Note that any combination of such coding units could be used together to achieve such functionality. For instance, NAL units and sub-bitstreams could be used together.

In some embodiments, temporal and/or spatial random access may be supported. Temporal random access could be achieved by introducing IRAPs (Intra Random Access Points) in the different sub-streams (e.g., attribute atlas, video, mesh, motion, and displacement sub-streams). Spatial random access could be supported through the definition and usage of tiles, sub-pictures, patch groups, and/or patches or any combination of these coding units. Metadata describing the layout and relationships between the different units could also need to be generated and included in the bitstream to assist the decoder in determining the units that need to be decoded.

As discussed above, various functionalities may be supported, such as:

- Spatial random access,
- Adaptive quality allocation (e.g., foveated compression like allocating higher quality to the face vs. the body of a human model),
- Region of Interest (ROI) access,
- Coding unit level metadata (e.g., object descriptions, bounding box information),
- Spatial and quality scalability, and
- Adaptive streaming and decoding (e.g., stream/decode high priority regions first).

The disclosed compression schemes allow the various coding units (e.g., patches, patch groups and tiles) to be compressed with different encoding parameters (e.g., subdivision scheme, subdivision iteration count, quantization parameters, etc.), which can introduce compression artefacts (e.g., cracks between patch boundaries). In some embodiments, as further discussed below an efficient (e.g., computational complexity, compression efficiency, power consumption, etc. efficient) strategy may be used that allows the scheme to handle different coding unit parameters without introducing artefacts.

Mesh Tile

Figure 8A:
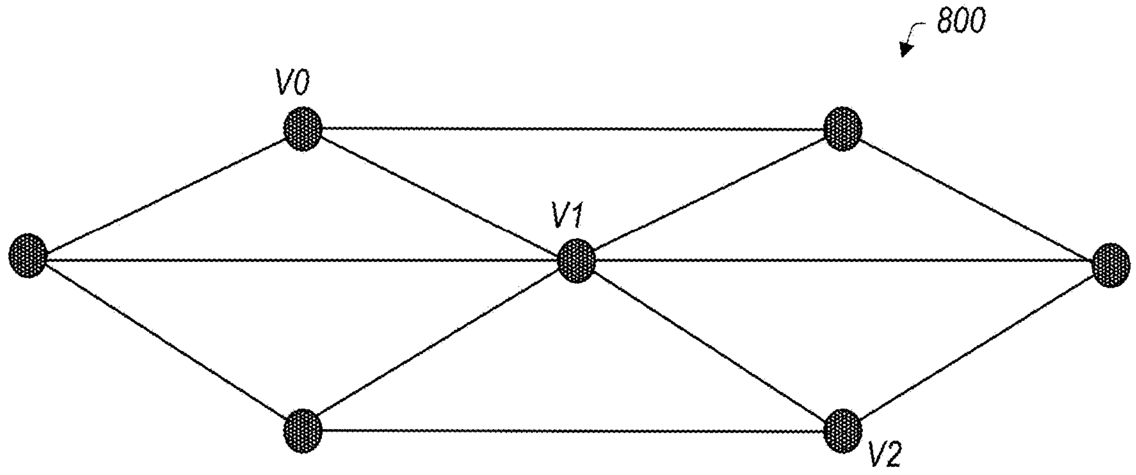
FIGS. 8A-8B illustrate segmentation of a mesh into multiple tiles, according to some embodiments.
Figure 8B:
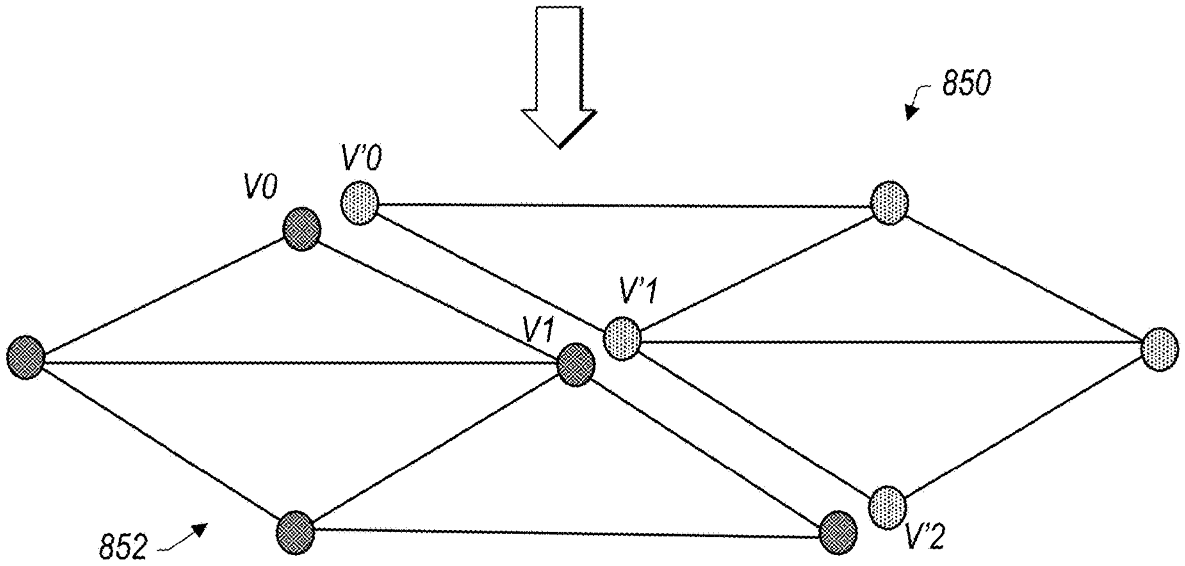

A mesh could be segmented into a set of tiles (e.g., parts/segments), which could be encoded and decoded independently. Vertices/edges that are shared by more than one tile are duplicated as illustrated in FIGS. 8A/8B. Note that mesh 800 is split into two tiles 850 and 852 by duplicating the three vertices {V0, V1, V2}, and the two shared edges {(V0, V1), (V1, V2)}. Said another way, when a mesh is divided into two tiles each of the two tiles include vertices and edges that were previous one set of vertices and edges in the combined mesh, thus the vertices and edges are duplicated in the tiles.

Sub-Mesh

Figure 9:
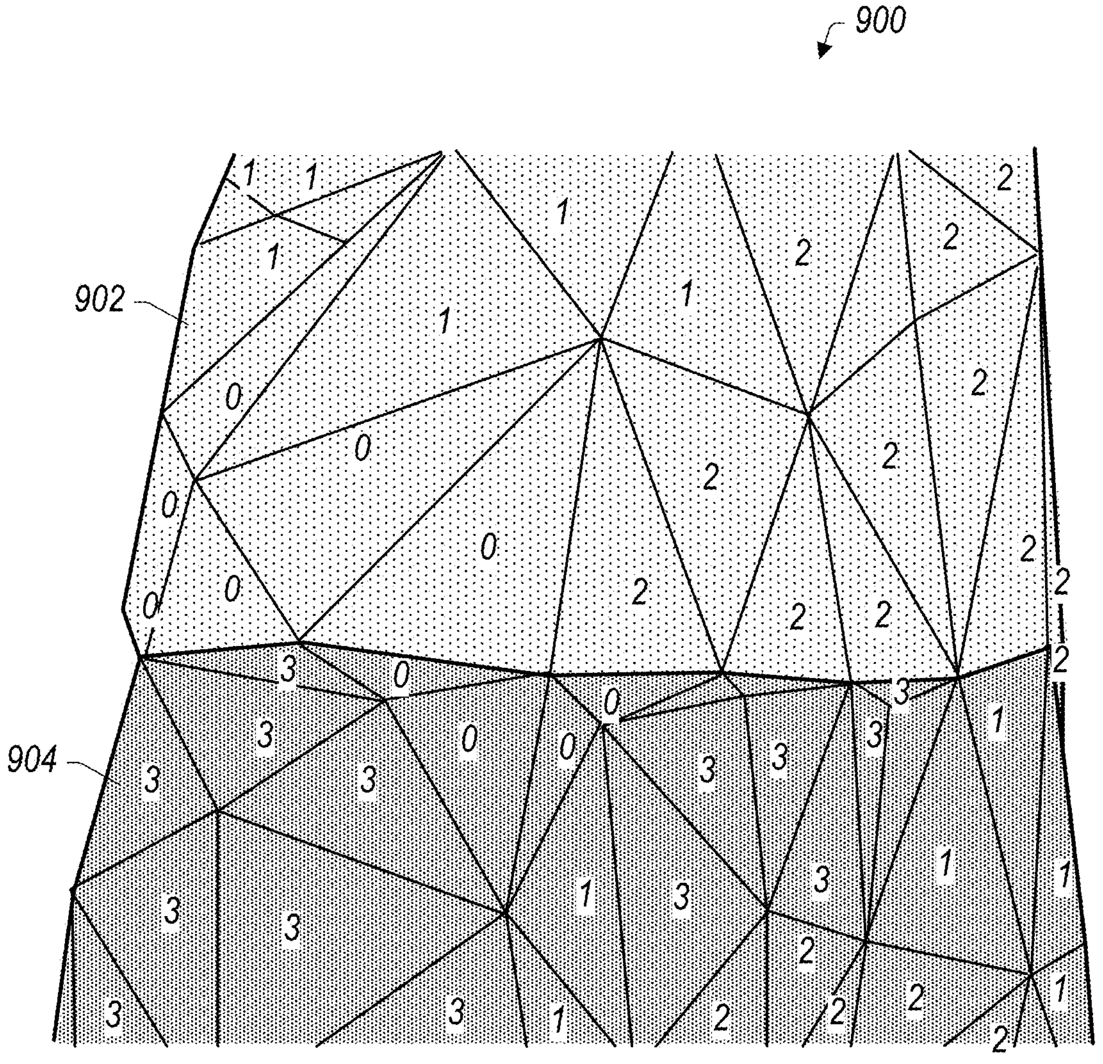
FIG. 9 illustrates a mesh segmented into two tiles, each comprising sub-meshes, according to some embodiments.
Figure 10A:
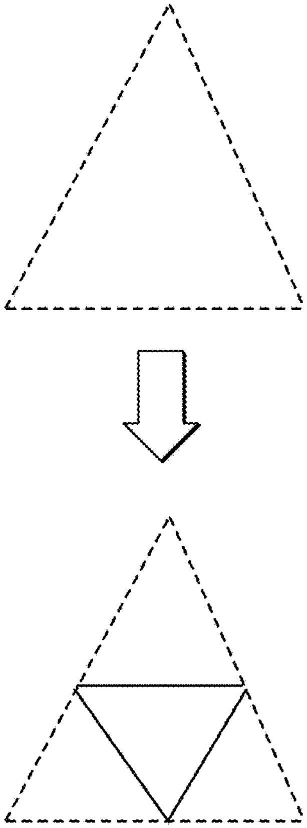
FIGS. 10A-10D illustrate adaptive sub-division based on edge subdivision rules for shared edges, according to some embodiments.
Figure 10B:
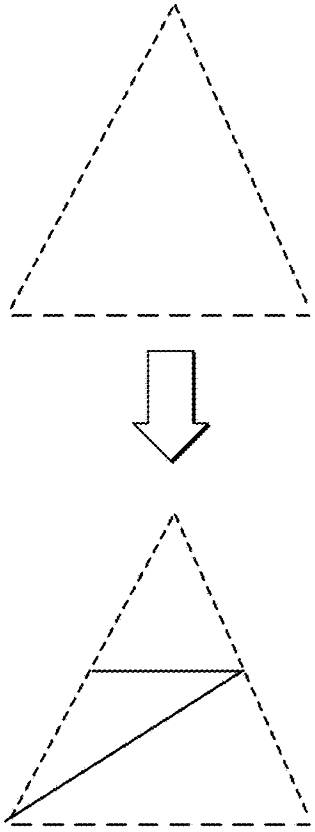
Figure 10C:
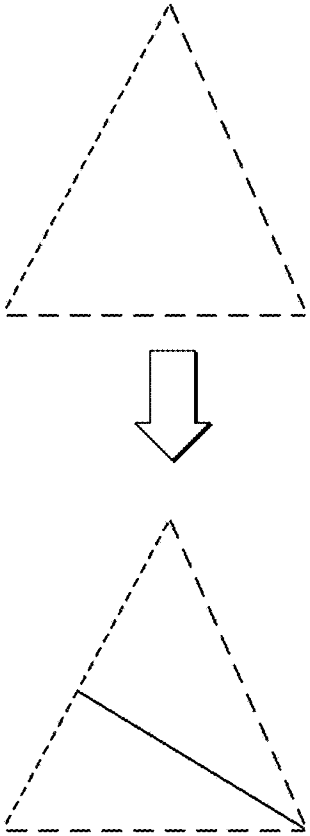
Figure 10D:
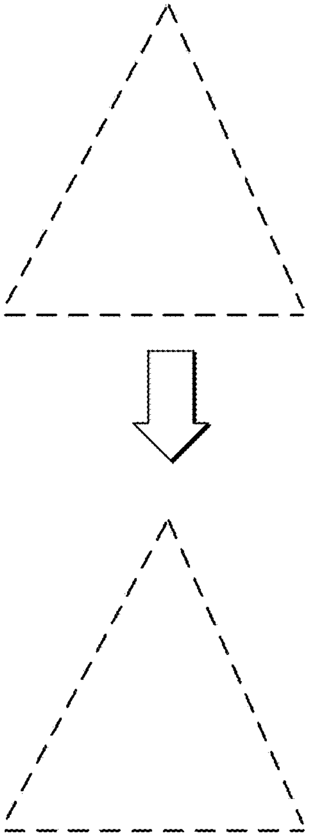

Each tile could be further segmented into a set of sub-meshes, which may be encoded while exploiting dependencies between them. For example, FIG. 9 shows an example of a mesh 900 segmented into two tiles (902 and 904) containing three and four sub-meshes, respectively. For example, tile 902 includes sub-meshes 0, 1, and 2; and tile 904 includes sub-meshes 0, 1, 2, and 3.

The sub-mesh structure could be defined either by:

Explicitly encoding a per face integer attribute that indicates for each face of the mesh the index of the sub-mesh it belongs to, or Implicitly detecting the Connected Components (CC) of the mesh with respect to the position's connectivity or the texture coordinate's connectivity or both and by considering each CC as a sub-mesh. The mesh vertices are traversed from neighbor to neighbor, which makes it possible to detect the CCs in a deterministic way. The indices assigned to the CCs start from 0 and are incremented by one each time a new CC is detected.

Patch

In some embodiments, a sub-mesh could belong to one or multiple patches (e.g., associate metadata with overlapping parts of the mesh). In another embodiment, a sub-mesh may belong to only a single patch. Vertices located on the boundary between patches are not duplicated. Patches are also encoded while exploiting correlations between them and therefore, they cannot be encoded/decoded independently.

The list of sub-meshes associated with a patch may be encoded by using various strategies, such as:

Entropy coding

Intra-frame prediction

Inter-frame prediction

Local sub-mesh indices (i.e., smaller range)

Patch Group

A patch group is a set of patches. A patch group is particularly useful to store parameters shared by its patches or to allow a unique handle that could be used to associate metadata with those patches.

In some embodiments, in order to support using different encoding parameters per patch, the following may be used:

The relationship between sub-meshes and patches may be exploited such that each face of the base mesh is assigned a patch ID.

Vertices and edges belonging to a single sub-mesh are assigned the patch ID the sub-mesh belongs to.

Vertices and edges located on the boundary of two or multiple patches are assigned to all the corresponding patches.

When applying the subdivision scheme, the decision to subdivide an edge or not is made by considering the subdivision parameters of all the patches the edge belongs to.

Figure 11C:
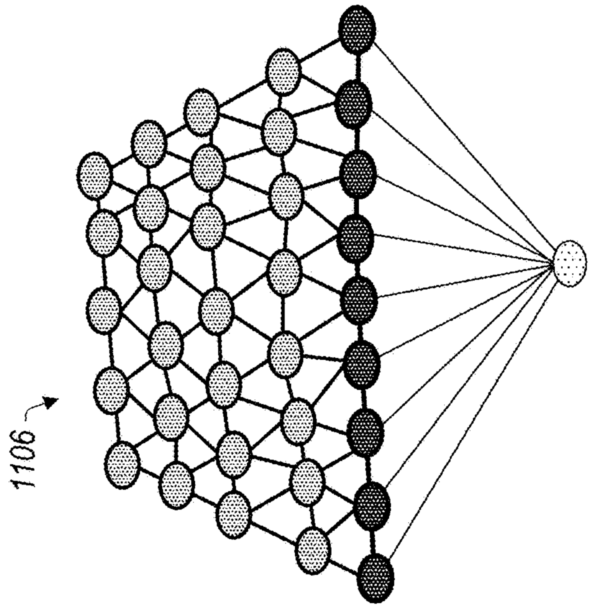
FIGS. 11A-11C illustrate adaptive sub-division for adjacent patches, wherein shared edges are sub-divided in a way that ensures vertices of adjacent patches align with one another, according to some embodiments.
Figure 11B:
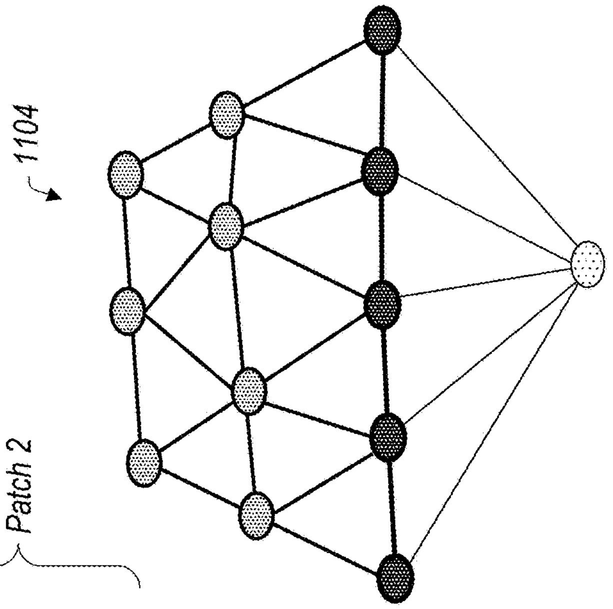
Figure 11A:
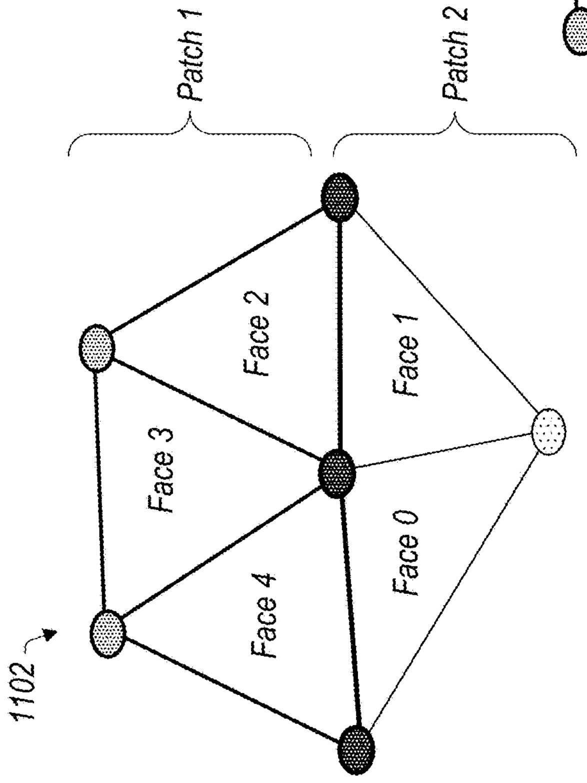

For example, FIGS. 11A-11C illustrate adaptive subdivision based on shared edges. Based on the subdivision decisions as determined in FIGS. 11A-11C (e.g., suppose that there is an edge that belongs to two patches Patch0 and Patch1, Patch0 has a subdivision iteration count of 0, Patch1 has a subdivision iteration count of 2. The shared edge will be subdivided 2 times (i.e., take the maximum of the subdivision counts)), the edges are sub-divided using the sub-division scheme shown in FIGS. 10A-10D. For example, based on the subdivision decisions associated with the different edges, the adaptive subdivision scheme described in FIG. 11 is applied. FIGS. 11A, 11B, 11C, and 11D show how to subdivide a triangle when 3, 2, 1, or 0 of its edges should subdivided, respectively. Vertices created after each subdivision iteration are assigned to the patches of their parent edge.

When applying quantization to the wavelet coefficients, the quantization parameters used for a vertex are selected based on the quantization parameters of all the patches the vertex belongs to. For example, suppose that a patch belongs to two patches, Patch0 and Patch1. Patch0 has a quantization parameter QP1. Patch1 has a quantization parameter QP2. The wavelet coefficients associated with the vertex will be quantized using the quantization parameter QP=min (QP1, QP2).

Mesh Tiles

To support mesh tiles, the encoder could partition the mesh into a set of tiles, which are then encoded/decoded independently by applying any mesh codec or use a mesh codec that natively supports tiled mesh coding.

In both cases, the set of shared vertices located on tile boundaries are duplicated. To avoid cracks appearing between tiles, the encoder could either:

Encode stitching information indicating the mapping between duplicated vertices as follows:

Encode per vertex tags identifying duplicated vertices (by encoding a vertex attribute with the mesh codec)

Encode for each duplicated vertex the index of the vertex it should be merged with.

Make sure that the decoded positions and vertex attributes associated with the duplicated vertices exactly match Per vertex tags identifying duplicated vertices and code this information as a vertex attribute by using the mesh codec Apply an adaptive subdivision scheme as described in the previous section to guarantee a consistent subdivision behavior on tile boundaries The encoder needs to maintain the mapping between duplicated vertices and adjust the encoding parameters to guarantee matching values Encode the duplicated vertex positions and vertex attribute values in a lossless manner Disable wavelet transform (transform bypass mode)

Perform a search in the encode parameter space to determine a set of parameters that are encoded in the bitstream and guarantee matching positions and attribute values Do nothing The decoder would decompress the per vertex tag information to be able to identify the duplicated vertices. If different encoding parameters were signaled by the encoder for the duplicated vertices compared to non-duplicated ones, the decoder should adaptively switch between the set of two parameters based on the vertex type (e.g., duplicated vs. non-duplicated).

The decoder could apply smoothing and automatic stitching as a post processing based on signaling provided by the encoder or based on the analysis on the decoded meshes. In a particular embodiment, a flag is included per vertex or patch to enable/disable such post-processing. This flag could be among others:

signaled as an SEI message, encoded with the mesh codec, or signaled in the atlas sub-bitstream.

In another embodiment, the encoder could duplicate regions of the mesh and store them in multiple tiles. This could be done for the purpose of:

Error resilience,

Guard bands, and

Seamless/adaptive streaming.

Figure 12:
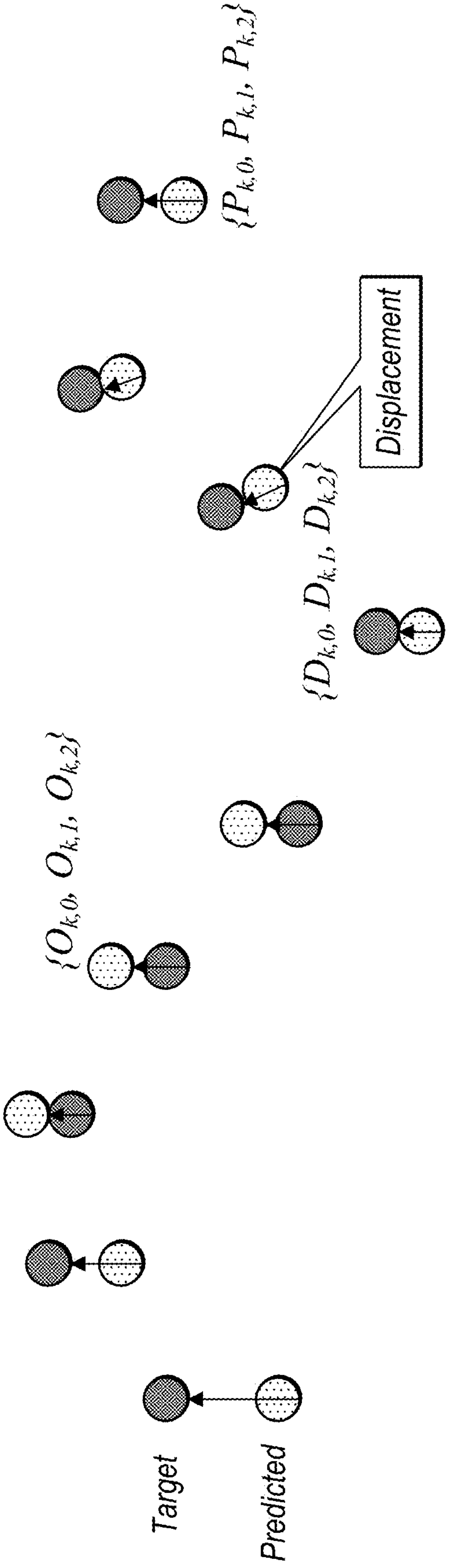
FIG. 12 illustrates an example set of vertices of a base mesh that are displaced by displacement vectors to result in a reconstructed dynamic mesh, according to some embodiments.

FIG. 12 illustrates an example set of vertices of a base mesh that are displaced by displacement vectors to result in a reconstructed dynamic mesh, according to some embodiments.

When the total number of vertices of the target mesh and the predicted mesh is N, the vertex positions in the target mesh is $\vec{O}=\{O_0, \vec{O}_1, \vec{O}_2, \vec{O}_3 \ldots \vec{O}_{N-1}\}$ with $\vec{O}_k=\{O_{k,0}, O_{k,1}, O_{k,2}\}$ (e.g., X, Y, and Z position values for the $k^{th}$ vertex), and the vertex positions in the predicted mesh is $\vec{P}=\{\vec{P}_0, \vec{P}_1, \vec{P}_2, \vec{P}_3 \ldots \vec{P}_{N-1}\}$ with $\vec{P}_K=\{P_{k,0}, P_{k,1}, P_{k,2}\}$ (e.g., X, Y, and Z position values for the $k^{th}$ vertex), the displacement value of a vertex k is conceptually as follows:

$$D_k = \{D_{k,0}, D_{k,1}, D_{k,2}\} = \{O_{k,0} - P_{k,0}, O_{k,1} - P_{k,1}, O_{k,2} - P_{k,2}\}$$

At the encoder side, the displacement data $\vec{D}=\{\vec{D}_0, \vec{D}_1, \vec{D}_2, \ldots, \vec{D}_{N-1}\}$ can be transformed by a transform method, such as the wavelet transform, into displacement coefficients (or coefficients) $\vec{C}=\{\vec{C}_0, \vec{C}_1, \vec{C}_2, \ldots, \vec{C}_{N-1}\}$. In the case that the displacement data is not transformed, $\vec{C}=\vec{D}$. The transformed data can be, then, quantized.

After quantization (if applied), $\vec{C}$ can be placed onto an image. The k-th component of the i-th coefficients, $C_{i,k}$ corresponding to the k-th coordinate in the 3D space, can be placed on a pixel position $\{x_{i,k}, y_{i,k}\}$. The mapping between (i,k) and $\{x_{i,k}, y_{i,k}\}$ can be represented as $\{x_{i,k}, y_{i,k}\}$=scanorder (i, k).

Signaling Sub-Mesh Identifiers

In some embodiments, several methods may be used to indicate sub-meshes. For example, an atlas tile layer may convey sub-mesh information in the atlas sub-bitstream. For example, as shown in FIG. 4, the compressed bitstream b(i) includes multiple-sub-bitstreams such as the compressed base mesh bitstream, the compressed displacement sub-bitstream, and the compressed attribute sub-bitstream. Note that both the compressed displacement sub-bitstream and the compressed attribute sub-bitstream are video encoded, and therefore can be included in one or more atlas sub-bitstreams. As discussed above, a compressed mesh may be divided into multiple sub-meshes and these sub-meshes may have components in each of the sub-bitstreams. For example, a base mesh for a sub-mesh may be included in a base-mesh sub-bitstream. Also, an atlas sub-bitstream may include compressed displacement values and compressed attribute information for one or more sub-meshes. The sub-mesh signaling techniques disclosed herein may be used in an MPEG standard codec, such as in V-DMC.

In some situations, it may be beneficial for the Atlas Data sub-bitstream (e.g., the sub-bitstream (as shown in FIG. 4) comprising the compressed displacement data) to indicate the sub mesh IDs of the sub meshes corresponding to each tile layer of the atlas data sub-bitstream. This may allow mesh refinement information, such as corresponding to a base mesh subdivision method, to easily be located in the atlas data sub-bitstream. This may also indicate the corresponding area in the 2D images where the relevant refinement information can be found for a given sub mesh. Being able to locate the sub mesh information for each tile layer enables partial decoding, such as in V-DMC compression. The indices of the sub-meshes that correspond to the patches in the tile layer can be explicitly signaled in the atlas tile header. When multiple patches that correspond to the same sub mesh ID are signaled in different tile layers, they can be combined to create one sub mesh.

FIG. 13 illustrates example components of a compressed bitstream, according to some embodiments.

As an example, a compressed bitstream 1302, such as may be generated by encoder 402 or encoder 406, includes base mesh sub-bitstream 1304 and atlas sub-bitstream 1306. The base mesh sub-bitstream 1304 further includes encoded base meshes for different sub-meshes such as encoded base meshes for sub-meshes, X, Y, and Z. In some embodiments the encoded base meshes for the sub-meshes may include sub-mesh IDs, such as ID XXXX, ID YYYY, and ID ZZZZ. For example, each of the encoded sub-mesh base meshes 1308, 1316, and 1318 may be identifiable in the base mesh sub-bitstream 1304. However, in the atlas sub-bitstream displacement video frames 1312 through 1322 and attribute video frames 1314 through 1324 are not restricted to only include patches for a single sub-mesh and instead may include patches for more than one sub-mesh. Also, the atlas data, such as atlas tile and path data 1310 through 1320 may include patch data for multiple video frames. Also, in some embodiments, multiple tiles may reference the same video frame. Thus, determining which patches communicated in the atlas sub-bitstream 1306 correspond to which ones of the sub-meshes communicated in the base mesh sub-bitstream 1304 is non-trivial.

In some embodiments, in order to identify displacements communicated in patches packed into video frames 1312 through 1322 and to identify attribute values communicated in patches packed into video frames 1314 through 1324, sub-mesh IDs (or other means for identifying sub-meshes such as sub-mesh index positions) are communicated in the tile headers of the atlas tile and patch data 1310 through 1320. Also, in some embodiments, sub-mesh identifiers may further be signaled for patch data units (PDUs) included in the tiles.

More specifically, n the basemesh sub-bitstream (such as base mesh sub-bitstream 1304), each submesh can be distinguished by its submesh ID derived from smh_id signalled in submesh_header ( ) The submesh ID can be derived based on the syntax elements signalled in the basemesh submesh information.

| | Descriptor |
|---|---|
| bmesh_sub_mesh_information( ) { | |
| bmsi_use_single_mesh_flag | u(1) |
| if(!bmsi_use_single_mesh_flag){ | |
| bmsi_num_submeshes_minus2 | u(8) |
| } | |
| else | |
| bmsi_num_submeshes_minus2 = −1 | |
| bmsi_signalled_submesh_id_flag | u(1) |
| if( bmsi_signalled_submesh_id_flag ) { | |
| bmsi_signalled_submesh_id_length_minus1 | ue(v) |
| for( i = 0; < bmsi_num_submeshes_minus2 + 2; i++ ) | |
| bmsi_submesh_id[ i ] | u(v) |
| SubMeshIDToIndex[ bmsi_submesh_id[ i ] ] = i | |
| SubMeshIndexToID[ i ] = bmsi_submesh_id[ i ] | |
| } | |
| } | |
| else | |
| for( i = 0; i < bmsi_num_submeshes_minus2 + 2; i++ ) { | |
| bmsi_submesh_id[ i ] = i | |
| SubMeshIDToIndex[ i ] = i | |
| SubMeshIndexToID[ i ] = i | |
| } | |
| } | |

Figure 15:
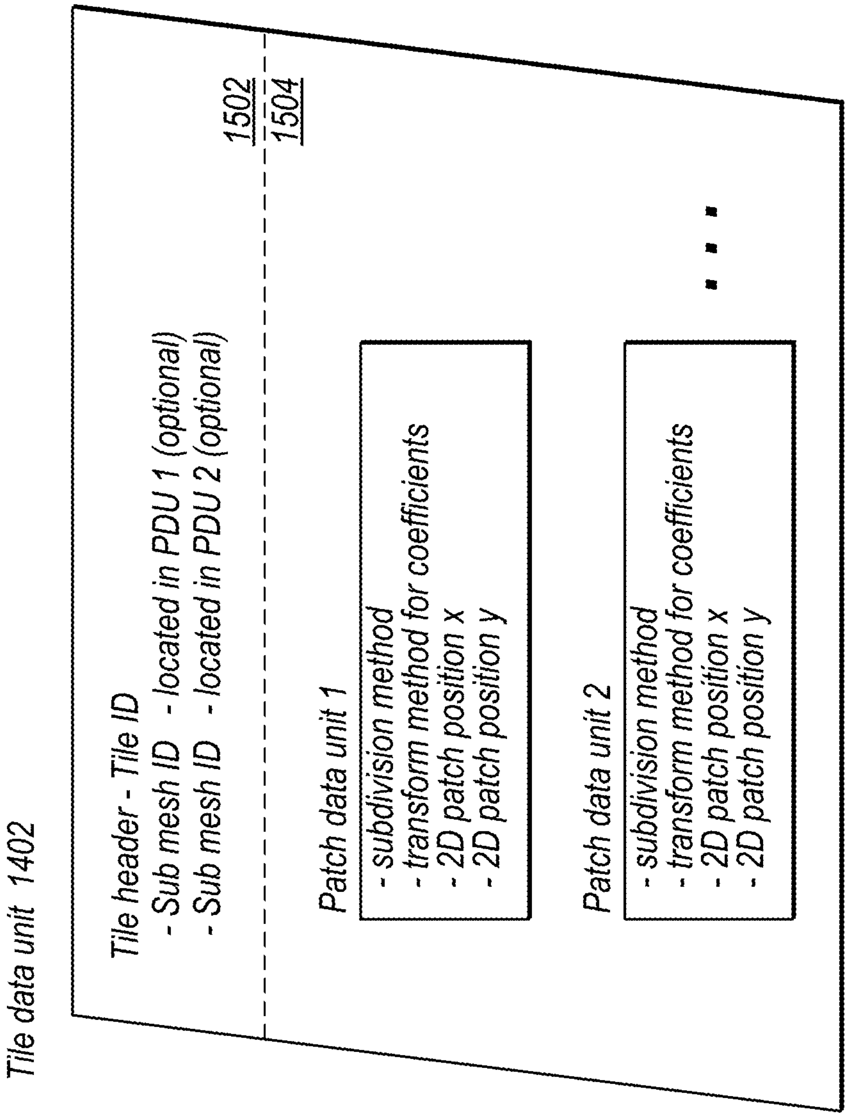
FIG. 15 illustrates an example tile data unit included in the atlas sub-bitstream wherein sub-mesh IDs are included in a tile header of the tile data unit, according to some embodiments.
Figure 17:
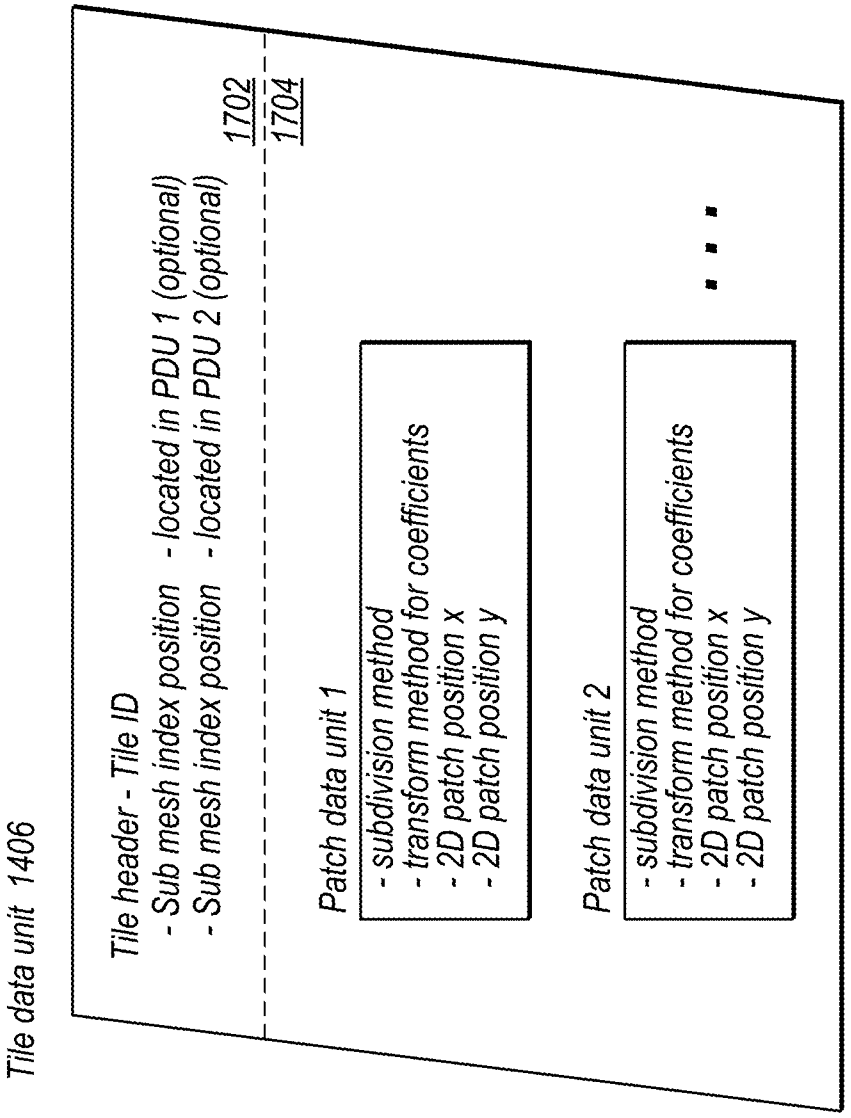
FIG. 17 illustrates another example tile data unit included in the atlas sub-bitstream, wherein sub-mesh index positions information is included in the tile header of the tile data unit, according to some embodiments.

The arrays SubMeshIDToIndex and SubMeshIndexToID provide a forward and inverse mapping, respectively, of the ID associated with each submesh and the order index of each submesh. The submesh ID is specified as SubMeshIndexToID [smh_id]. For example, in some embodiments, as shown in FIG. 15 a sub-mesh ID may be signaled in the tile header of a tile data unit of the atlas sub-bitstream 1306 to identify where sub-mesh displacements (and/or attribute values) are signaled in the atlas sub-bitstream 1306. As another example, as shown in FIG. 17, sub-mesh index position values may be signaled in the tile header of a tile data unit of the atlas sub-bitstream 1306 to identify where sub-mesh displacements (and/or attribute values) are signaled in the atlas sub-bitstream 1306.

In the data units corresponding to patches (such as patch data units 1410 (PDUs 1410)), the submesh ID of the submesh that corresponds to the patch may be signaled. For example, in a patch data unit, submesh ID may be signaled as follows:

| | Descriptor |
|---|---|
| patch_data_unit( tileID, patchIdx ) { | |
| pdu_submesh_id[ tileID ][ patchIdx ] | u(v) |
| pdu_vertex_count_minus1[ tileID ][ patchIdx ] | ue(v) |
| ... | |

pdu_submesh_id [tileID][patchIdx] indicates the associated submesh ID specified in the current patch with index patchIdx, in the current atlas tile with tile ID equal to tileID.

Figure 14:
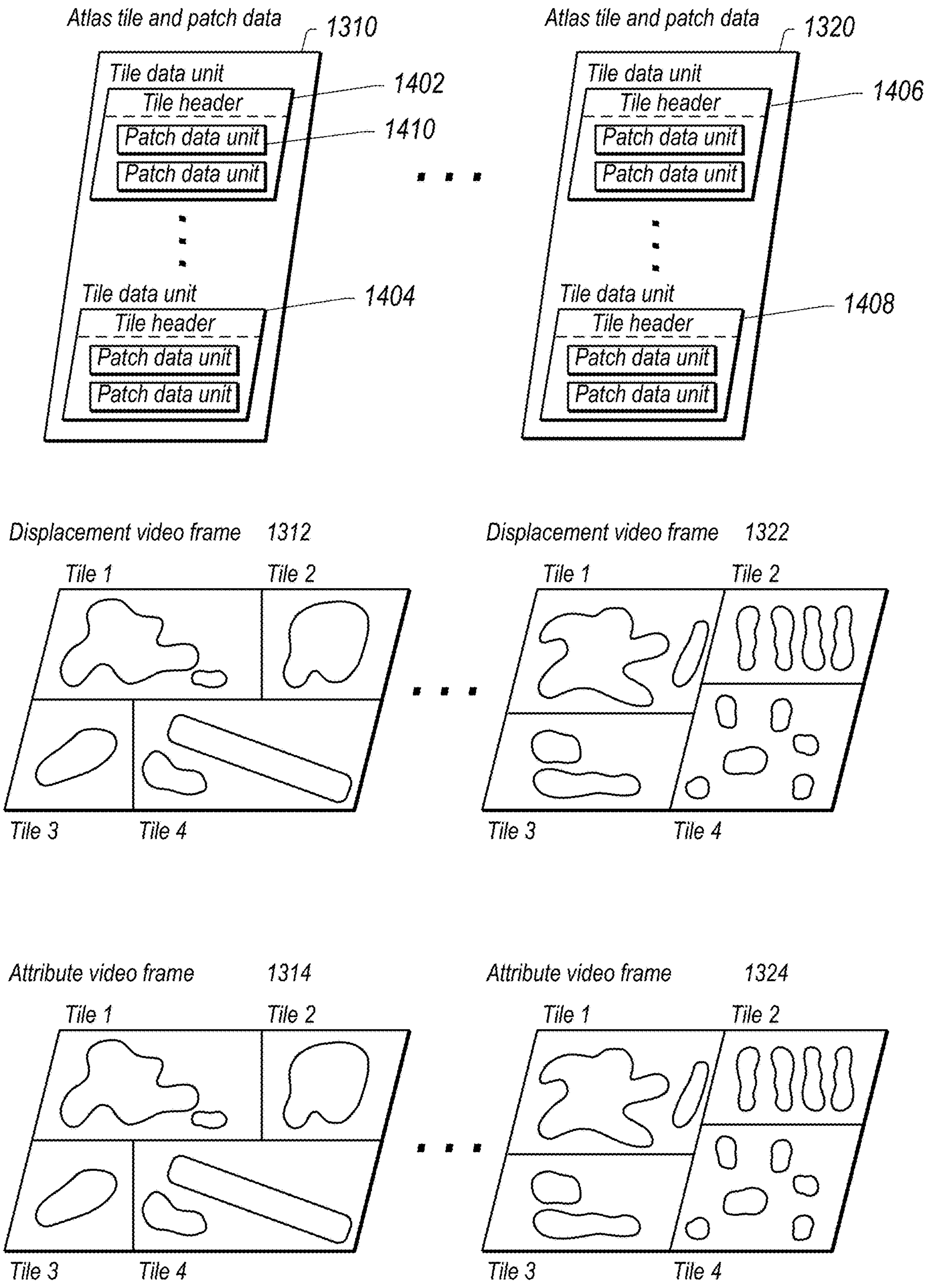
FIG. 14 illustrates example components of the atlas sub-bitstream of the compressed bitstream, according to some embodiments.

FIG. 14 illustrates example components of the atlas sub-bitstream of the compressed bitstream, according to some embodiments.

For example, atlas tile and patch data 1310 through 1320 may include tile date units, such as tile data units 1402, 1404, 1406, and 1408. Each of the tile data units may include a tile header and one or more patch data units, wherein the patch data units include information for identifying patches within a given tile. For example, tile data unit 1402 may correspond to tile 1 of displacement video frame 1312 and tile 1 of attribute video frame 1314. Though it should be noted that in some embodiments, different patch sizing and/or packing may be used to pack attribute patches differently from displacement patches. As another example, tile data unit 1404 may correspond to a different tile in displacement video frame 1312 and attribute video frame 1314, such as tile 4. Also the separate patch data units included in the respective tile data units may provide information for identifying and mapping patches in the corresponding tiles to a 3D volume of the reconstructed volumetric visual content.

FIG. 15 illustrates an example tile data unit included in the atlas sub-bitstream wherein sub-mesh IDs are included in a tile header of the tile data unit, according to some embodiments.

For example, tile data unit 1402 may include a tile header 1502 that includes sub-mesh IDs indicating sub-meshes that have patches included in tile 1 (which corresponds to tile data unit 1402). Also, which PDU the respective sub-mesh patches are included in may also optionally be signaled. For example, patch data unit 1402 includes tile header 1502 that includes sub-mesh IDs, and body 1504 includes PDUs for the tile represented by tile data unit 1402.

Figure 16:
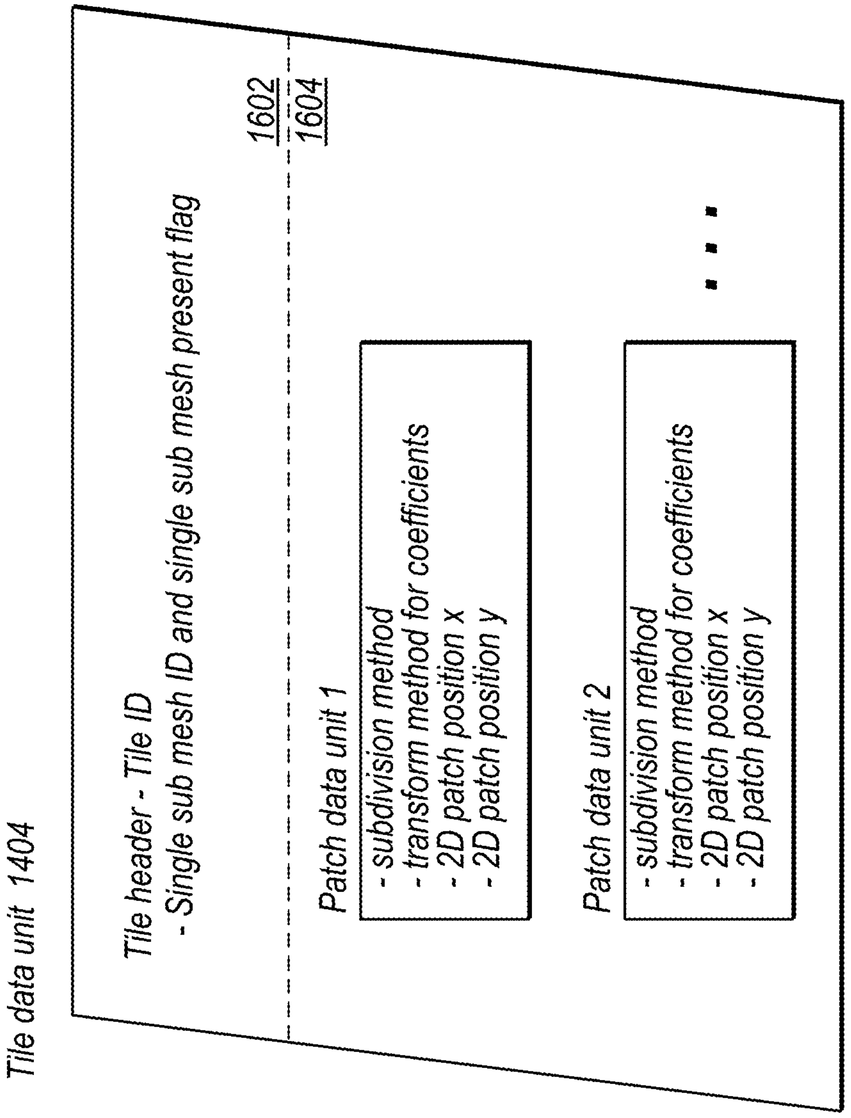
FIG. 16 illustrate an example tile data unit included in the atlas sub-bitstream, wherein a single sub-mesh ID and a "single sub-mesh present" flag are included in a tile header of the tile data unit, according to some embodiments.

FIG. 16 illustrate an example tile data unit included in the atlas sub-bitstream, wherein a single sub-mesh ID and a "single sub-mesh present" flag are included in a tile header of the tile data unit, according to some embodiments.

In some embodiments, in which only one sub-mesh has patches included in a tile corresponding to a tile data unit, a single sub-mesh present flag may be set. For example, patch data unit 1404 corresponds to tile 2 and may only include a single patch (or patches) corresponding to a single sub-mesh. For example, patch data unit 1404 includes tile header 1602 that includes a sub-mesh ID and a single sub-mesh present flag, and body 1604 includes PDUs for the tile represented by tile data unit 1404.

FIG. 17 illustrates another example tile data unit included in the atlas sub-bitstream, wherein sub-mesh index positions information is included in the tile header of the tile data unit, according to some embodiments.

As another option, instead of signaling a sub-mesh ID in the tile header, in some embodiments, sub-mesh index position information may be signaled in the tile header. Wherein the base-mesh sub-bitstream includes information for identifying a given sub-mesh based on its sub-mesh index position. For example, tile data unit 1406 includes tile header 1702 that includes sub-mesh index position, and optionally indicates which one of the PDUs a given sub-mesh has patches in. Also, the body 1704 of tile data unit 1406 includes patch data units, as shown in FIG. 17.

More particularly, in the atlas tile header, the number of sub meshes corresponding to the patches that refer to the atlas tile header can be signaled as follows:

| | Descriptor |
|---|---|
| atlas_tile_header( ) { | |
| ... | |
| if( asps_vdmc_extension_present_flag ){ | |
| athe_use_single_mesh_flag[ ath_id ] | u(1) |
| if( !athe_use_single_mesh_flag ) | |
| athe_num_submeshes_minus2[ ath_id ] | ue(v) |
| else | |
| athe_num_submeshes_minus2[ ath_id ]= −1 | |
| asve_signalled_submesh_id_length_minus1[ ath_id ] | ue(v) |
| AtheNumSubmesh[ ath_id ] = athe_use_single_mesh_flag[ ath_id ] ? | |
| 1: athe_num_submeshes_minus2[ ath_id ] +2 | |
| for( i = 0; < AtheNumSubmesh[ ath_id ] ; i++ ) | |
| athe_submesh_id[ ath_id ][ i ] | u(v) |
| } | |
| byte_alignment( ) | |
| } | |

In the above chart, the following syntax elements are used:

athe_use_single_mesh_flag [ath_id] indicates the patches refer to this atlas tile header with ath_id is ath_id correspond to a single mesh. When it is not present, athe_use_single_mesh_flag is inferred as true.

athe_num_submeshes_minus2 [ath_id] plus 2 indicates the number of sub-meshes that correspond to the patches referred to in this atlas tile header with ath_id is ath_id. When it is not present, athe_num_submeshes_minus2 is inferred as −1.

athe_signalled_submesh_id_length_minus1 [ath_id] plus 1 specifies the number of bits used to represent the syntax element athe_submesh_id [ath_id][i].

athe_submesh_id [ath_id][i] indicates the i-th submesh index of the sub-mesh that correspond to the patches referred to in this atlas tile header. When it is not present, athe_submesh_id [i] is inferred as 0. The length of the athe_submesh_id [ath_id][i] syntax element is AsveSubmeshIdBitCount bits where AsveSubmeshIdBitCount=(athe_signalled_submesh_id_length_ minus1 [ath_id]+1)

In some embodiments, it is a requirement that athe_signalled_tile_id_length_minus1 [ath_id] is greater or equal to bmsi_signalled_submesh_id_length_minus1.

Also, in some embodiments, the value of pdu_submesh_id [tileID][patchIdx] signaled in patch_data_unit (tileID, patchIdx) shall be one of athe_submesh_id [ath_id][i] where i is in the range 0 to AtheNumSubmesh [ath_id]−1, inclusive.

In some embodiments, ath_submesh_id [i] shall not be equal to ath_submesh_id [j] for all i!=j.

In some embodiments, AsveSubmeshIdBitCount can be derived from a syntax element signaled in the ASPS (atlas sequence parameter set). For example:

| | Descriptor |
|---|---|
| asps_vdmc_extension( ) { | |
| ... | |
| asve_signalled_submesh_id_length_minus1 | ue(v) |
| ... | |
| } | |

asve_signalled_submesh_id_length_minus1 plus 1 specifies the number of bits used to represent the syntax element athe_submesh_id [ath_id][i].

$$AsveSubmeshIdBitCount = (\text{asve\_signalled\_submesh\_id\_length\_minus1} + 1).$$

In some embodiments, it is a requirement that asve_signalled_tile_id_length_minus1 is greater or equal to bmsi_signalled_submesh_id_length_minus1.

In some embodiments, instead of signaling athe_use_single_mesh_flag and athe_num_submeshes_minus1, the number of sub-meshes corresponding to the patches referred to in this atlas tile header can be signaled explicitly. For example, tile data unit 1402 may explicitly signal that two sub-meshes are referenced in the tile header 1502 as well as the sub-mesh IDs for the two sub-meshes. However, for the tile data unit 1404 shown in FIG. 16 instead of explicitly signaling the number of sub-meshes that are referenced in the tile header 1602, the single sub-mesh present flag may be used.

Also, as discussed with regard to FIG. 17, a mapping to the sub-mesh ID may be signaled instead of directly signaling the sub-mesh ID itself. For example, athe_submesh_id can be a mapping between the sub-mesh id signaled in a patch and the sub-mesh ID of a sub-mesh. In this case, the signaling method can be as follows:

| | Descriptor |
|---|---|
| atlas_tile_header( ) { | |
| ... | |
| if( asps_vdmc_extension_present_flag ){ | |
| athe_use_single_mesh_flag[ ath_id ] | u(1) |
| if( !athe_use_single_mesh_flag ) | |
| athe_num_submeshes_minus2[ ath_id ] | ue(v) |
| else | |
| athe_num_submeshes_minus2[ ath_id ]= −1 | |
| AtheNumSubmesh[ ath_id ] = athe_use_single_mesh_flag[ ath_id ] | |
| ? | |
| 1: athe_num_submeshes_minus2[ ath_id ] +2 | |
| athe_signalled_submesh_id_flag[ ath_id ] | u(1) |
| if( athe_signalled_submesh_id_flag ){ | |
| athe_signalled_submesh_id_length_minus1[ ath_id ] | ue(v) |
| for( i = 0; < AtheNumSubmesh[ ath_id ] ; i++ ) { | |
| athe_submesh_id[ ath_id ][ i ] | u(v) |
| SubMeshIDToIndex[ ath_id ][ athe_submesh_id[ i ] ] = i | |
| SubMeshIndexToID[ ath_id ][ i ] = athe_submesh_id[ i ] | |
| } | |
| } else { | |
| for( i = 0; i < AtheNumSubmesh[ ath_id ] ; i++ ) { | |
| athe_submesh_id[ ath_id ][ i ] = i | |
| SubMeshIDToIndex[ ath_id ][ i ] = i | |
| SubMeshIndexToID[ ath_id ][ i ] = i | |
| } | |
| } | |
| ... | |

where submesh ID of the submesh for a patch, pdu_submesh_id [tileID][patchIdx], is one of the values in athe_submesh_id [ath_id].

In some embodiments, athe_signalled_submesh_id_flag [ath_id] is not signaled but inferred as 0 when afti_single_tile_in_atlas_frame_flag is true or afti_num_tiles_in_atlas_frame_minus1 is 0.

In some embodiments, the submesh index signalled in patch data unit and inter patch data unit, such as pdu_submesh_id [tileID][patchIdx] can be coded with athe_signalled_submesh_id_length_minus1 [ath_id]+1 or asve_signalled_submesh_id_length_minus1+1 bits.

In some embodiments, when the number of sub-meshes in the atlas tile, AtheNumSubmesh [ath_id] is 1, submesh ID of patch data unit and inter patch data unit, such as pdu_submesh_id [tileID][patchIdx] can be inferred as athe_submesh_id [ath_id] [0] instead of being signaled.

During reconstruction, when a sub-mesh with a given sub-mesh ID needs to be decoded, the decoder decodes only the atlas tile layer (e.g. atlas data unit) whose atlas tile header has that sub-mesh's ID in the athe_submesh_id (e.g. atlas tile header sub-mesh ID field).

Figure 18:
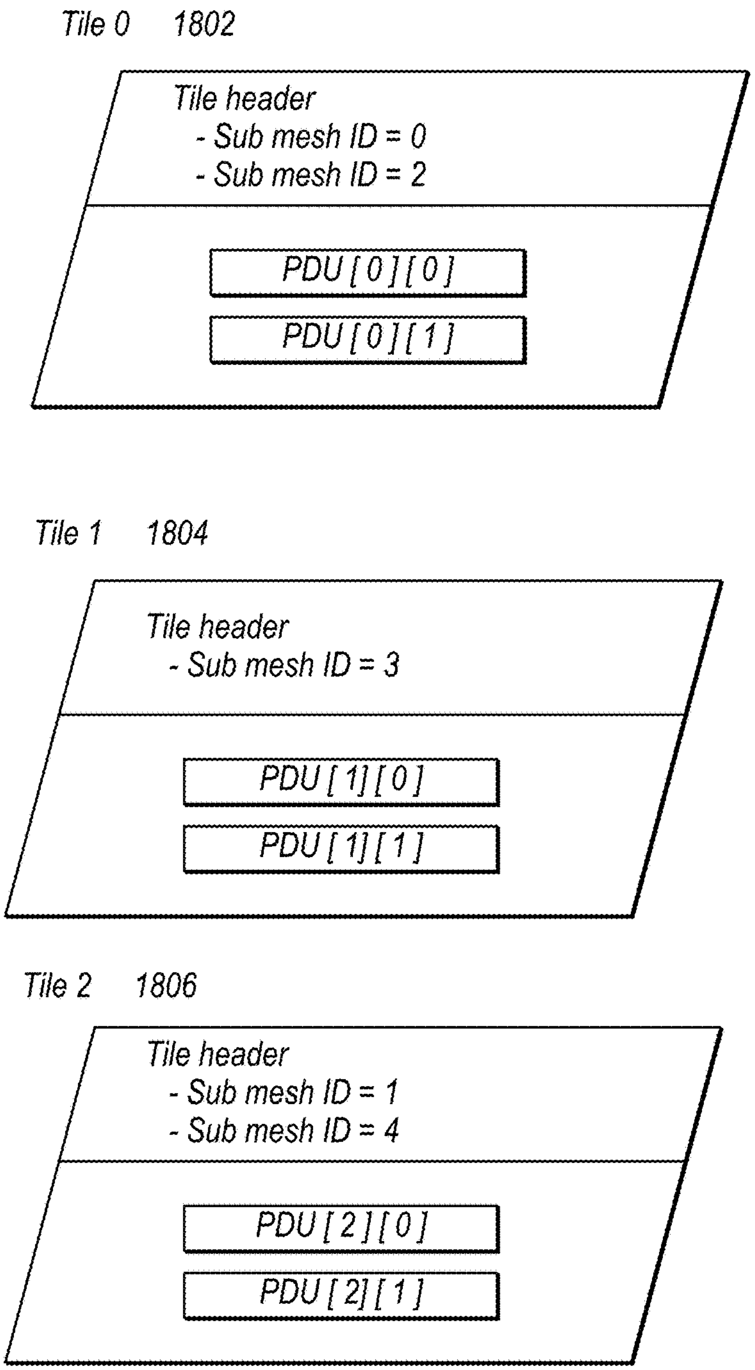
FIG. 18 illustrates an example parsing of a tile data unit to identify patch data units corresponding to a given sub-mesh that is to be reconstructed, according to some embodiments.

FIG. 18 illustrates an example parsing of a tile data unit to identify patch data units corresponding to a given sub-mesh that is to be reconstructed, according to some embodiments.

For example, say there are 3 tiles and 5 sub-meshes. The patches in tile [0] correspond to sub-mesh [0] and sub-mesh [2]. The patches in tile [1] correspond to sub-mesh [3] and the patches in tile [2] correspond to sub-mesh [1] and sub-mesh [4]. athe_submesh_id in each tile header will be athe_submesh_id [0]={0, 2}
athe_submesh_id [1]={3}
athe_submesh_id [2]={1, 4}

When the decoder needs to decode sub-mesh [1], the decoder parses down to the atlas tile header and searches for the submeshID(=1) in athe_submesh_id. In this example, the decoder will find the submeshID(=1) in tile [2]. Then the decoder will decode patches only in tile [2] without decoding other tiles (tile [0] and tile [1]).

Figure 19:
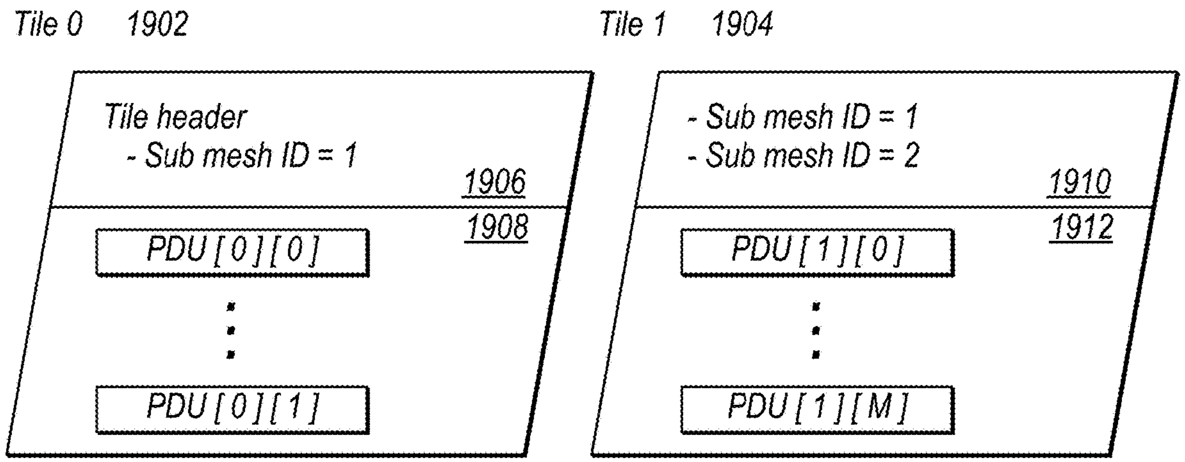
FIG. 19 illustrates an example parsing of multiple tile data units to identify path data units corresponding to a given sub-mesh that is to be reconstructed, according to some embodiments.

FIG. 19 illustrates an example parsing of multiple tile data units to identify path data units corresponding to a given sub-mesh that is to be reconstructed, according to some embodiments.

In some embodiments, there is no restriction that the sub-mesh ID for a patch in an atlas frame should be unique. For example, the information for one sub-mesh can be signaled in multiple patches. Also, the multiple patches can be signaled in multiple tiles. If multiple patches contain the information for one sub-mesh and are signaled in multiple tiles, it could have an impact on partial decoding since multiple tiles will be required to decode one sub-mesh. When sub-meshes with the same sub-mesh ID are reconstructed (=processed with the information from the atlas data sub-bitstream such as subdivision, adding displacements, etc.) multiple times, the sub-meshes are concatenated to create one sub-mesh. The order of concatenation can be based on tile IDs or patch indices or tile IDs and patch indices. In another embodiment, the order of concatenation can be explicitly signaled. When sub-meshes are concatenated, the connectivity can be updated based on the updated vertex indices.

For example, say there are two patch data units in one tile. Such as pdu[0][0] and pdu[0][1] with the same pdu_submesh_id, 1. This is shown in FIG. 19 for tile 1902, which both include sub-mesh 1. This indicates the information such as pdu_subdivision_method, pdu_transform_method, pdu_2d_pos_x, pdu_2d_pos_y from pdu[0][0] and pdu[0][1] is applied to the same sub-mesh of the decoded base-mesh (e.g., the output of the base-mesh sub-bitstream), for example for basemesh_submesh [1]. When submesh [1][0] is reconstructed with the information from pdu[0][0] and basemesh_submesh [1] and submesh [1][1] is reconstructed with the information from pdu[0][1], then the final submesh [1] is the concatenation of submesh [1][0] and submesh [1][1]. The vertex count of submesh [1][0] is pdu_vertex_count_minus1 [0][0] and the vertex count of submesh [1][1] is pdu_vertex_count_minus1 [0][1]. The vertex count of submesh [1] is vertex count of submesh [1][0]+vertex count of submesh [1][1].

In some embodiments, sub-mesh 1 could further be concatenated with sub-mesh information from tile 1904.

Figure 20:
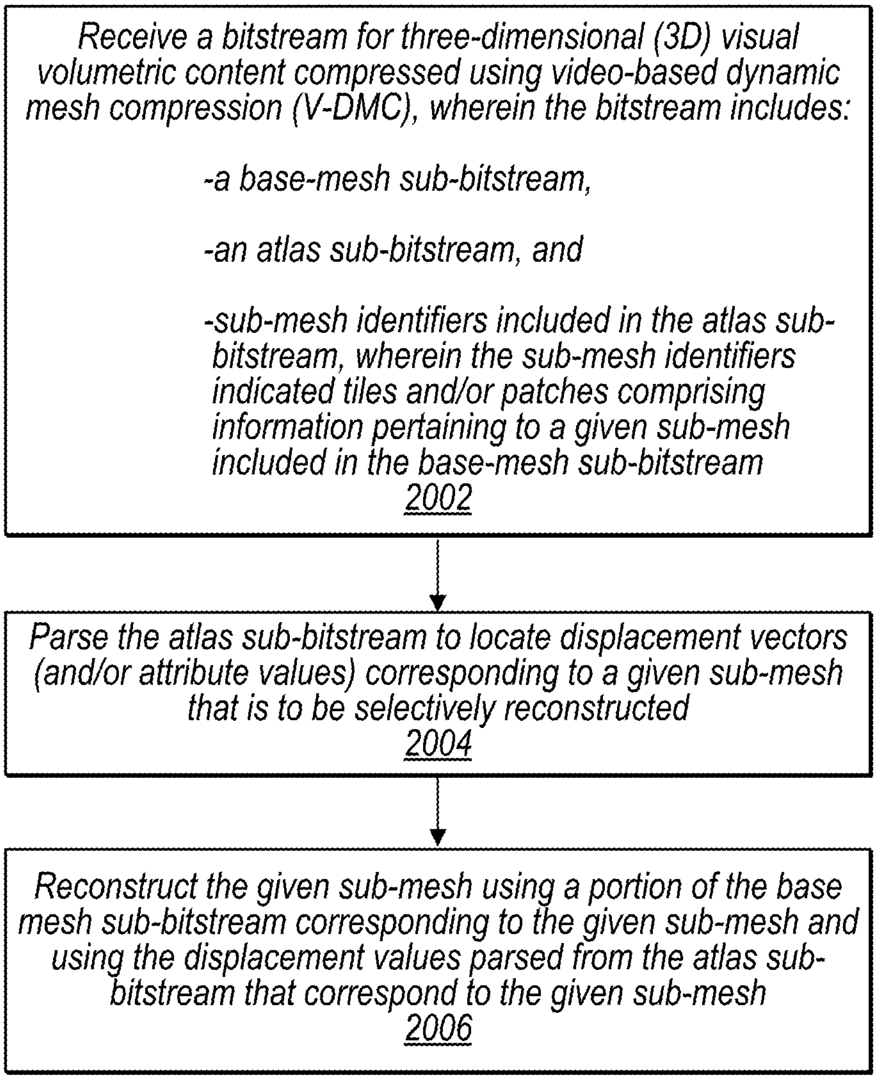
FIG. 20 is a flowchart illustrating a process performed by a decoder to reconstruct a given sub-mesh using sub-mesh identifiers included in an atlas sub-bitstream, according to some embodiments.

FIG. 20 is a flowchart illustrating a process performed by a decoder to reconstruct a given sub-mesh using sub-mesh identifiers included in an atlas sub-bitstream, according to some embodiments.

At block 2002, a decoder receives a bitstream for three-dimensional (3D) visual volumetric content compressed using video-based dynamic mesh compression (V-DMC), wherein the bitstream includes a base-mesh sub-bitstream, such as base mesh sub-bitstream 1304, an atlas sub-bitstream, such as atlas sub-bitstream 1306, and sub-mesh identifiers included in the atlas sub-bitstream, wherein the sub-mesh identifiers indicated tiles and/or patches comprising information pertaining to a given sub-mesh included in the base-mesh sub-bitstream. For example, the received bitstream includes sub-mesh identifiers in the atlas sub-bitstream, such as sub-mesh IDs or index values as shown in tile headers 1502, 1602, and 1702.

At block 2004, the decoder parses the atlas sub-bitstream to locate displacement vectors (and/or attribute values) corresponding to a given sub-mesh that is to be selectively reconstructed. For example, as shown in FIG. 18, if attempting to reconstruct sub-mesh 4, the decoder may parse the tile headers for tiles 0, 1, and 2 without parsing the bodies of the respective tiles. Based on parsing the tile headers, the decoder may determine that displacement and/or attribute information locations in the video frames are defined in a patch data unit of tile 2. The decoder may then parse the body of tile 2 to extract the needed patch data unit information for sub-mesh 4, without having to parse patch data unit information for other tiles and/or other sub-meshes that are not selected to be reconstructed.

At block 2006, the decoder reconstructs the given sub-mesh using a portion of the base mesh sub-bitstream corresponding to the given sub-mesh and using the displacement values parsed from the atlas sub-bitstream that correspond to the given sub-mesh. For example, a particular one of the encoded base meshes 1308, 1316, and 1318 may be used to generate the base mesh for the given sub-mesh and the displacement and attribute values extracted from the PDUs of the tile determined at block 2004 may be used to selectively reconstruct the given sub-mesh.

Figure 21:
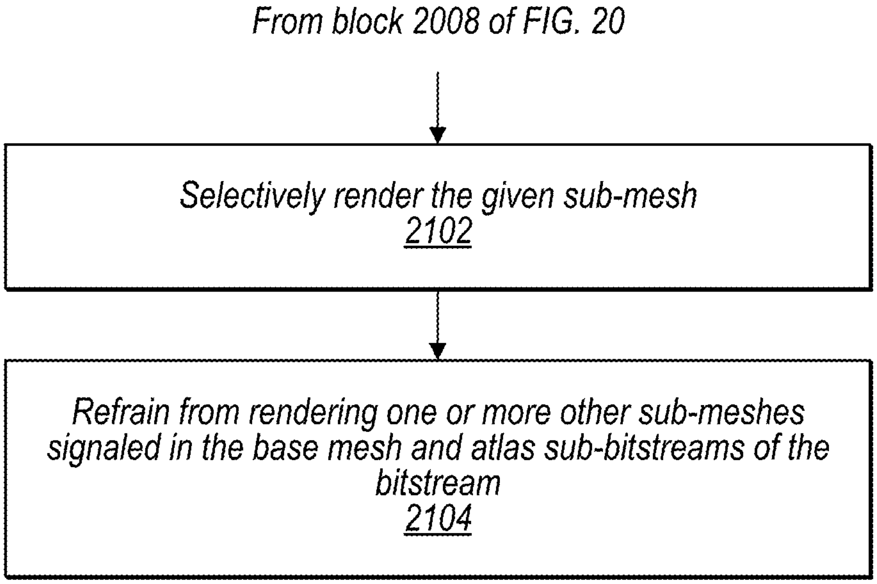
FIG. 21 is a flowchart illustrating further process steps performed by the decoder to selectively render the given sub-mesh while refraining from rendering other sub-meshes not selected for rendering, according to some embodiments.

FIG. 21 is a flowchart illustrating further process steps performed by the decoder to selectively render the given sub-mesh while refraining from rendering other sub-meshes not selected for rendering, according to some embodiments.

The reconstructed mesh may further be selectively rendered at block 2102. In some embodiments, selective rendering may include applying attribute values, such as texture or colors to the reconstructed mesh. Also, at block 2104, the decoder refrains from rendering one or more other sub-meshes signaled in the base mesh and atlas sub-bitstreams of the bitstream. For example, other sub-meshes may not be selected for rendering, and processing steps for those sub-meshes such as identifying displacements and attribute values, may be omitted.

Figure 22:
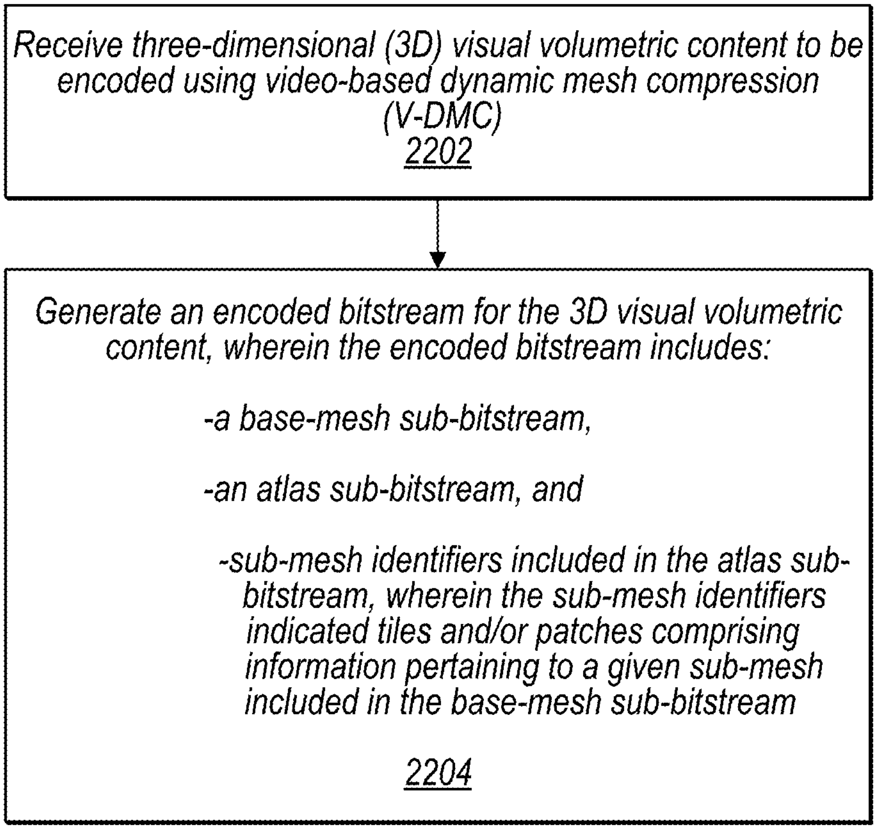
FIG. 22 is a flowchart illustrating a process performed by an encoder to generate a bitstream for a compressed representation of three-dimensional visual volumetric content, wherein sub-mesh identifiers are included in an atlas sub-bitstream of the bitstream, according to some embodiments.

FIG. 22 is a flowchart illustrating a process performed by an encoder to generate a bitstream for a compressed representation of three-dimensional visual volumetric content, wherein sub-mesh identifiers are included in an atlas sub-bitstream of the bitstream, according to some embodiments.

At block 2202, an encoder receives three-dimensional (3D) visual volumetric content to be encoded using video-based dynamic mesh compression (V-DMC). For example encoders 402 and 406 may receive three-dimensional (3D) visual volumetric content to be encoded.

At block 2204, the encoder generates an encoded bitstream for the 3D visual volumetric content, wherein the encoded bitstream includes a base-mesh sub-bitstream, an atlas sub-bitstream, and sub-mesh identifiers included in the atlas sub-bitstream, wherein the sub-mesh identifiers indicated tiles and/or patches comprising information pertaining to a given sub-mesh included in the base-mesh sub-bitstream. For example, encoder 402 or 406 may output a compressed bitstream 1302 as shown in FIG. 13 that includes a base mesh sub-bitstream 1304 and an atlas sub-bitstream 1306. The atlas sub-bitstream 1306 includes sub-mesh identifiers in tile headers (and optionally in PDUs), for example as shown in FIGS. 15-17.

Example Computer System

Figure 23:
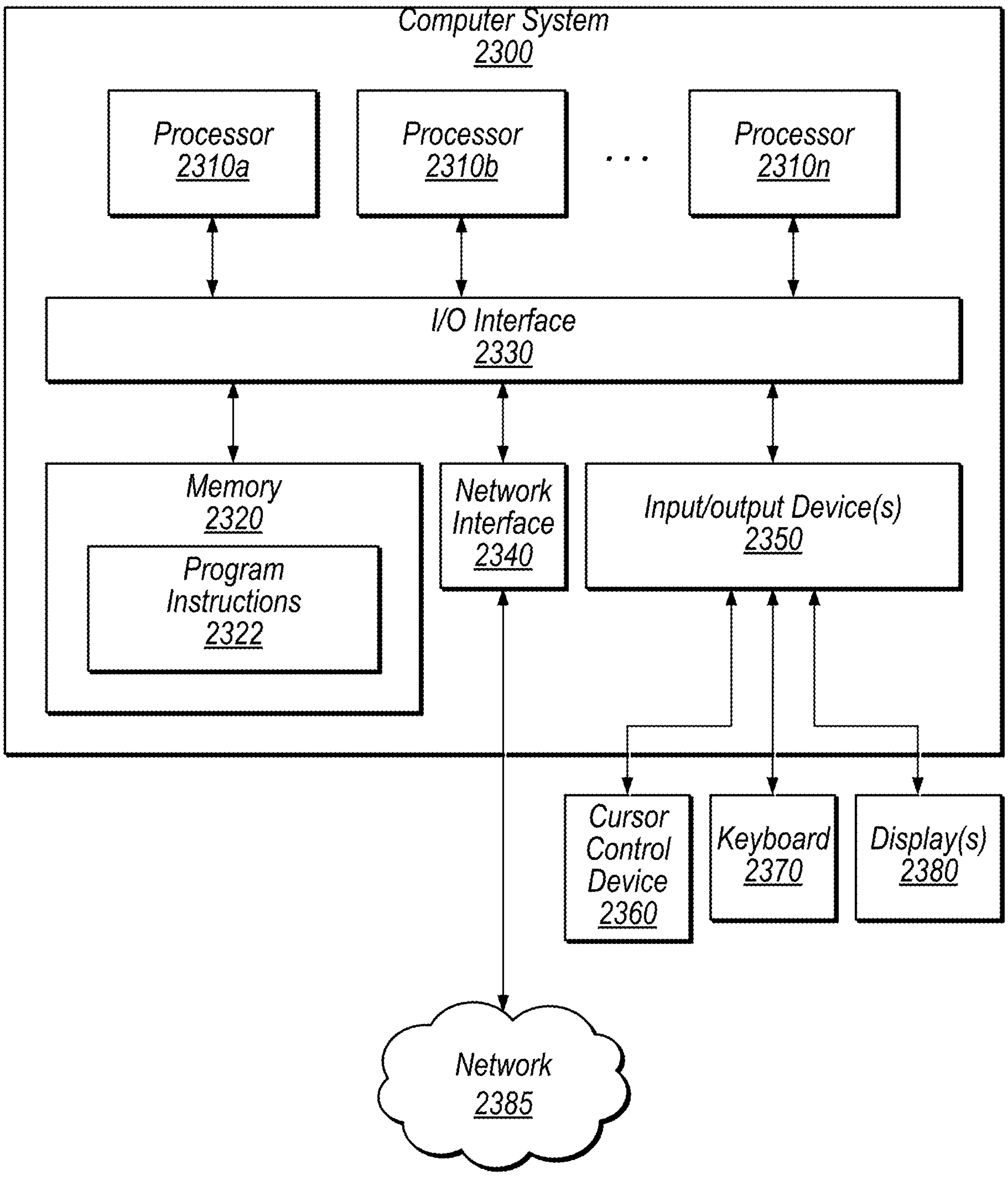
FIG. 23 illustrates an example computer system that may implement an encoder or decoder, according to some embodiments.

FIG. 23 illustrates an example computer system 2300 that may implement an encoder or decoder or any other ones of the components described herein, (e.g., any of the components described above with reference to FIGS. 1-22), in accordance with some embodiments. The computer system 2300 may be configured to execute any or all of the embodiments described above. In different embodiments, computer system 2300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 2300, which may interact with various other devices. Note that any component, action, or functionality described above with respect to FIGS. 1-22 may be implemented on one or more computers configured as computer system 2300 of FIG. 23, according to various embodiments. In the illustrated embodiment, computer system 2300 includes one or more processors 2310 coupled to a system memory 2320 via an input/output (I/O) interface 2330. Computer system 2300 further includes a network interface 2340 coupled to I/O interface 2330, and one or more input/output devices 2350, such as cursor control device 2360, keyboard 2370, and display(s) 2380. In some cases, it is contemplated that embodiments may be implemented using a single instance of computer system 2300, while in other embodiments multiple such systems, or multiple nodes making up computer system 2300, may be configured to host different portions or instances of embodiments. For example, in one embodiment some elements may be implemented via one or more nodes of computer system 2300 that are distinct from those nodes implementing other elements.

In various embodiments, computer system 2300 may be a uniprocessor system including one processor 2310, or a multiprocessor system including several processors 2310 (e.g., two, four, eight, or another suitable number). Processors 2310 may be any suitable processor capable of executing instructions. For example, in various embodiments processors 2310 may be general-purpose or embedded processors implementing any of a variety of instruction set architectures (ISAs), such as the x86, PowerPC, SPARC, or MIPS ISAs, or any other suitable ISA. In multiprocessor systems, each of processors 2310 may commonly, but not necessarily, implement the same ISA.

System memory 2320 may be configured to store point cloud compression or point cloud decompression program instructions 2322 and/or sensor data accessible by processor 2310. In various embodiments, system memory 2320 may be implemented using any suitable memory technology, such as static random-access memory (SRAM), synchronous dynamic RAM (SDRAM), nonvolatile/Flash-type memory, or any other type of memory. In the illustrated embodiment, program instructions 2322 may be configured to implement an image sensor control application incorporating any of the functionality described above. In some embodiments, program instructions and/or data may be received, sent or stored upon different types of computer-accessible media or on similar media separate from system memory 2320 or computer system 2300. While computer system 2300 is described as implementing the functionality of functional blocks of previous Figures, any of the functionality described herein may be implemented via such a computer system.

In one embodiment, I/O interface 2330 may be configured to coordinate I/O traffic between processor 2310, system memory 2320, and any peripheral devices in the device, including network interface 2340 or other peripheral interfaces, such as input/output devices 2350. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. Also, in some embodiments some or all of the functionality of I/O interface 2330, such as an interface to system memory 2320, may be incorporated directly into processor 2310.

Network interface 2340 may be configured to allow data to be exchanged between computer system 2300 and other devices attached to a network 2385 (e.g., carrier or agent devices) or between nodes of computer system 2300. Network 2385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2350 may, in some embodiments, include one or more display terminals, keyboards, keypads, touchpads, scanning devices, voice or optical recognition devices, or any other devices suitable for entering or accessing data by one or more computer systems 2300. Multiple input/output devices 2350 may be present in computer system 2300 or may be distributed on various nodes of computer system 2300. In some embodiments, similar input/output devices may be separate from computer system 2300 and may interact with one or more nodes of computer system 2300 through a wired or wireless connection, such as over network interface 2340.

As shown in FIG. 23, memory 2320 may include program instructions 2322, which may be processor-executable to implement any element or action described above. In one embodiment, the program instructions may implement the methods described above. In other embodiments, different elements and data may be included. Note that data may include any data or information described above.

Those skilled in the art will appreciate that computer system 2300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2300 may be transmitted to computer system 2300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory, computer-readable storage medium storing program instructions that, when executed using one or more computing devices, cause the one or more computing devices to:

receive a bitstream for a mesh that has been compressed using video-based dynamic mesh compression, wherein:

the bitstream comprises a base mesh sub-bitstream comprising encoded mesh information for a base mesh;

the bitstream comprises displacement values for a plurality of vertices to be included at subdivision location of the base mesh in a reconstructed version of the mesh; and the bitstream comprises an atlas sub-bitstream comprising sub-mesh identifiers for identifying respective sets of the displacement values that correspond to respective ones of a plurality of sub-meshes of the mesh;

parse the bitstream to locate displacement vectors corresponding to a given sub-mesh using the sub-mesh identifiers of the atlas sub-bitstream; and reconstruct the given sub-mesh of the mesh using at least a portion of the base mesh and the displacement values corresponding to the given sub-mesh.

2. The non-transitory, computer-readable storage medium of claim 1, wherein:

the displacement values are signaled using a patch data unit; and the atlas sub-bitstream comprises information indicating relationships between contents of a given patch data unit and a corresponding sub-mesh included in the base mesh sub-bitstream.

3. The non-transitory, computer-readable storage medium of claim 2, wherein:

the atlas sub-bitstream comprises tile identifiers for tiles of video frames, wherein the tile identifiers further comprise patch data unit information for locating respective patches included in the tiles of the video frames; and the tile identifiers comprise tile headers that indicate for respective ones of the tiles respective ones of the sub-meshes that have patches included in the respective ones of the tiles.

4. The non-transitory, computer-readable storage medium of claim 3, wherein respective ones of the tile headers that correspond to tiles with only a single sub-mesh included in the corresponding tiles include a single sub-mesh present flag.

5. The non-transitory, computer-readable storage medium of claim 2, wherein for a given sub-mesh, corresponding displacement values are included in patch data units spanning two or more tiles, and the atlas sub-bitstream indicates a set of patch data units spanning the two or more tiles that are to be concatenated to form a concatenated patch data unit that corresponds to a single sub-mesh.

6. The non-transitory, computer-readable storage medium of claim 5, wherein the patch data units that are to be concatenated are identified using a same sub-mesh identifier in respective tile headers of the two or more tiles.

7. The non-transitory, computer-readable storage medium of claim 1, wherein the sub-mesh identifiers are included in tile headers of the atlas sub-bitstream and/or frame headers of the atlas sub-bitstream.

8. The non-transitory, computer-readable storage medium of claim 7, wherein a given tile header indicates sub-mesh identifiers for each sub-mesh that has displacement values signaled in the tile corresponding to the given tile header.

9. The non-transitory, computer-readable storage medium of claim 8, wherein the sub-mesh identifiers included in the tile header of the atlas sub-bitstream comprises indices values corresponding to a sub-mesh index of the base mesh sub-bitstream.

10. The non-transitory, computer-readable storage medium of claim 1, wherein reconstructing the given sub-mesh of the mesh using the at least a portion of the base mesh and the displacement values corresponding to the given sub-mesh, comprises:

selectively rendering the given sub-mesh; and refraining from rendering one or more other sub-meshes of the mesh that are signaled in the base mesh sub-bitstream and the atlas sub-bitstream for the mesh.

11. The non-transitory, computer-readable storage medium of claim 1, wherein the sub-mesh identifiers further identify respective sets of attribute values that correspond to the respective ones of the plurality of sub-meshes of the mesh, wherein the program instructions, when executed using the one or more computing devices, further cause the one or more computing devices to:

parse the bitstream to locate attribute values corresponding to the given sub-mesh using the sub-mesh identifiers of the atlas sub-bitstream; and render the given sub-mesh of the mesh using the attribute values corresponding to the given sub-mesh.

12. The non-transitory, computer-readable storage medium of claim 1, wherein the base mesh sub-bitstream further comprises sub-mesh identifiers for respective base meshes to be used for the plurality of sub-meshes of the mesh.

13. The non-transitory, computer-readable storage medium of claim 1, wherein the base mesh sub-bitstream or the atlas sub-bitstream comprises mapping information for mapping sub-mesh IDs to sub-mesh indices used in the base mesh sub-bitstream and/or the atlas sub-bitstream.

14. A method, comprising:

receiving a bitstream for a mesh that has been compressed using video-based dynamic mesh compression, wherein:

the bitstream comprises a base mesh sub-bitstream comprising encoded mesh information for a base mesh;

the bitstream comprises displacement values for a plurality of vertices to be included at subdivision location of the base mesh in a reconstructed version of the mesh; and the bitstream comprises an atlas sub-bitstream comprising sub-mesh identifiers for identifying respective sets of the displacement values that correspond to respective ones of a plurality of sub-meshes of the mesh;

parsing the bitstream to locate displacement vectors corresponding to a given sub-mesh using the sub-mesh identifiers of the atlas sub-bitstream; and reconstructing the given sub-mesh of the mesh using at least a portion of the base mesh and the displacement values corresponding to the given sub-mesh.

15. The method of claim 14, further comprising:

receiving an indication of the given sub-mesh to reconstruct, wherein said reconstructing the given sub-mesh comprises selectively reconstructing the given sub-mesh, based on the indication, while refraining from reconstructing other ones of the plurality of sub-meshes not indicated for reconstruction.

16. The method of claim 14, wherein:

the atlas sub-bitstream comprises tile identifiers for tiles of video frames signaled in bitstream; and the tile identifiers comprise tile headers that indicate for respective ones of the tiles respective ones of the sub-meshes that have patches included in the respective ones of the tiles.

17. The method of claim 14, wherein the sub-mesh identifiers further identify respective sets of attribute values that correspond to the respective ones of the plurality of sub-meshes of the mesh, wherein the method further comprises:

parsing the bitstream to locate attribute values corresponding to a given sub-mesh using the sub-mesh identifiers of the atlas sub-bitstream; and rendering the given sub-mesh of the mesh using the attribute values corresponding to the given sub-mesh.

18. A non-transitory, computer-readable storage medium storing program instructions that, when executed using one or more computing devices, cause the one or more computing devices to:

receive three-dimensional visual content to be encoded using video-based dynamic mesh compression; and generate an encoded bitstream comprising:

a base mesh sub-bitstream comprising encoded mesh information for a base mesh;

displacement values for a plurality of vertices to be included at subdivision location of the base mesh in a reconstructed version of the mesh; and an atlas sub-bitstream comprising sub-mesh identifiers for identifying respective sets of the displacement values that correspond to respective ones of a plurality of sub-meshes of the mesh.

19. The non-transitory, computer-readable storage medium of claim 18, wherein:

the bitstream further comprises attribute values for the mesh; and the sub-mesh identifiers further identify respective sets of the attribute values that correspond to the respective ones of the plurality of sub-meshes of the mesh.

20. The non-transitory, computer-readable storage medium of claim 18, wherein the base mesh sub-bitstream or the atlas sub-bitstream comprises mapping information for mapping sub-mesh IDs to sub-mesh indices used in the base mesh sub-bitstream and/or the atlas sub-bitstream.

* * * * *